(12) United States Patent
Byun et al.

(10) Patent No.: US 7,624,924 B2
(45) Date of Patent: *Dec. 1, 2009

(54) HAND-HELD COMPACT ERGONOMIC LASER SCANNER WITH INTEGRATED SCANNER ACTIVATION OR DATA TRANSMISSION SWITCH IN SCANNER HOUSING

(76) Inventors: Sung Ho Byun, 1537 Chalet Dr., Cherry Hill, NJ (US) 08003; Mark C. Schmidt, 1659 Woodland Dr., Williamstown, NJ (US) 08094; Garrett K. Russell, 1137 Musket Rd., Newark, DE (US) 19713; David M. Wilz, Sr., 10 Orion Way, Sewell, NJ (US) 08080; Donald Hudrick, 24 Windemere Dr., Sicklerville, NJ (US) 08081; James A. Nahill, 37 Silver Birch Rd., Turnersville, NJ (US) 08012

( * ) Notice: Subject to any disclaimer, the term of this patent is extended or adjusted under 35 U.S.C. 154(b) by 764 days.

This patent is subject to a terminal disclaimer.

(21) Appl. No.: 10/928,907

(22) Filed: Aug. 27, 2004

(65) Prior Publication Data
US 2005/0023358 A1 Feb. 3, 2005

Related U.S. Application Data

(63) Continuation-in-part of application No. 10/104,641, filed on Mar. 22, 2002, now abandoned, which is a continuation of application No. 09/323,292, filed on Jun. 1, 1999, now Pat. No. 6,257,492, which is a continuation-in-part of application No. 08/645,335, filed on May 13, 1996, now Pat. No. 5,942,743, and a continuation-in-part of application No. 08/645,331, filed on May 13, 1996, now Pat. No. 5,844,227, and a continuation-in-part of application No. 08/943,267, filed on Oct. 3, 1997, now Pat. No. 6,098,885, and a continuation-in-part of application No. 08/850,295, filed on May 5, 1997, now abandoned, and a continuation-in-part of application No. 08/827,118, filed on Mar. 27, (Continued)

(51) Int. Cl.
*G06K 7/10* (2006.01)
(52) U.S. Cl. ............................ 235/462.01; 235/462.25; 235/462.38; 235/462.45; 235/462.46; 235/462.48; 235/472.01; 235/472.03
(58) Field of Classification Search ............ 235/462.01, 235/462.25, 462.38, 462.45, 462.46, 462.48, 235/472.01, 472.03
See application file for complete search history.

(56) References Cited

U.S. PATENT DOCUMENTS 5,151,581 A * 9/1992 Krichever et al. ........... 235/454

(Continued)

*Primary Examiner*—Allyson N Trail
(74) *Attorney, Agent, or Firm*—Ober/Kaler; Royal W. Craig

(57) ABSTRACT

An ergonomic single-line compact laser bar code scanning system having a compact housing for hand-held disposition at a counter. The scanning system is automatically-activated and includes a bar code symbol reading mechanism contained within a hand-supportable housing having a manually-activatable data transmission switch formed integrally in the housing. During symbol reading operations, the bar code symbol reading mechanism automatically generates a visible laser scanning pattern for repeatedly reading one or more bar code symbols on an object during a bar code symbol reading cycle, and automatically generating a new symbol character data string in response to each bar code symbol read thereby. During system operation, the user visually aligns the visible laser scanning pattern with a particular bar code symbol on an object (e.g., product, bar code menu, etc.) so that the bar code symbol is detected, scanned, and decoded. The user depresses the data transmission switch to produce a data transmission control activation signal and enabling a currently or subsequently produced symbol character data string to be automatically selected and transmitted to a host system.

26 Claims, 20 Drawing Sheets

Related U.S. Application Data

(63) 1997, now Pat. No. 5,925,870, said application No. 08/645,335 is a continuation-in-part of application No. 08/645,486, filed on May 13, 1996, now Pat. No. 5,796,091, said application No. 08/645,331 is a continuation-in-part of application No. 08/645,486, filed on May 13, 1996, now Pat. No. 5,796,091, which is a continuation-in-part of application No. 08/615,054, filed on Mar. 12, 1996, now Pat. No. 6,286,760, which is a continuation-in-part of application No. 08/292,237, filed on Aug. 17, 1994, now Pat. No. 5,808,285, and a continuation-in-part of application No. 08/365,193, filed on Dec. 28, 1994, now Pat. No. 5,557,093, and a continuation-in-part of application No. 08/293,493, filed on Aug. 19, 1994, now Pat. No. 5,525,789, and a continuation-in-part of application No. 08/573,949, filed on Dec. 18, 1995, now abandoned, and a continuation-in-part of application No. 08/561,479, filed on Nov. 20, 1995, now Pat. No. 5,661,292, and a continuation-in-part of application No. 08/278,109, filed on Nov. 24, 1993, now Pat. No. 5,484,992, and a continuation-in-part of application No. 08/489,305, filed on Jun. 9, 1995, now abandoned, and a continuation-in-part of application No. 08/476,069, filed on Jun. 7, 1995, now Pat. No. 5,591,953, and a continuation-in-part of application No. 08/584,135, filed on Jan. 11, 1996, now Pat. No. 5,616,908, said application No. 08/943,267 is a continuation of application No. 08/865,257, filed on May 29, 1997, now Pat. No. 6,460,767, which is a continuation of application No. 08/475,376, filed on Jun. 7, 1995, now Pat. No. 5,637,852, which is a continuation of application No. 08/365,193, filed on Dec. 28, 1994, now Pat. No. 5,557,093, which is a continuation of application No. 08/036,314, filed on Mar. 24, 1993, now abandoned, which is a continuation of application No. 07/580,738, filed on Sep. 10, 1990, now Pat. No. 5,216,232, said application No. 08/850,295 is a continuation of application No. 08/439,224, filed on May 11, 1995, now Pat. No. 5,627,359, said application No. 08/827,118 is a continuation of application No. 08/584,135, filed on Jan. 11, 1996, now Pat. No. 5,616,908.

U.S. PATENT DOCUMENTS

| | | | | |
|---|---|---|---|---|
| 5,512,740 | A * | 4/1996 | Hone et al. | 235/462.45 |
| 5,979,770 | A * | 11/1999 | Schlieffers et al. | 235/472.01 |
| 6,129,282 | A * | 10/2000 | Reddersen | 235/462.45 |
| 6,446,868 | B1 * | 9/2002 | Robertson et al. | 235/462.1 |
| 6,448,868 | B2 * | 9/2002 | Kato et al. | 333/103 |
| 6,913,201 | B1 * | 7/2005 | Wagner et al. | 235/472.01 |
| 2005/0199727 | A1 * | 9/2005 | Schmidt et al. | 235/462.46 |

* cited by examiner

HAND-HELD COMPACT ERGONOMIC LASER SCANNER WITH INTEGRATED SCANNER ACTIVATION OR DATA TRANSMISSION SWITCH IN SCANNER HOUSING

CROSS-REFERENCE TO RELATED APPLICATIONS

The present application is a continuation-in-part of U.S. application Ser. No. 10/104,641 filed Mar. 22, 2002 now abandoned, which is a continuation of U.S. application Ser. No. 09/323,292 filed Jun. 1, 1999 (now U.S. Pat. No. 6,257,492), which is a continuation-in-part of applications Ser. No. 08/645,335 filed May 13, 1996 (now U.S. Pat. No. 5,942,743), and Ser. No. 08/645,331 filed 13 May 1996 (now U.S. Pat. No. 5,844,227), and Ser. No. 08/943,267, filed Oct. 3, 1997 now U.S. Pat. No. 6,098,885, and Ser. No. 08/850,295 filed May 5, 1997 now abandoned, and Ser. No. 08/827,118, filed Mar. 27, 1997 now U.S. Pat. No 5,925,870.

Both of the Ser. Nos. 08/645,335 and 08/645,331 applications are continuations-in-part of application Ser. No. 08/645,486 filed May 13, 1996 (now U.S. Pat. No. 5,796,091), which is a continuation-in-part of Ser. No. 08/615,054 filed Mar. 12, 1996 (now U.S. Pat. No. 6,286,760), which is a continuation-in-part of application Ser. No. 08/292,237 filed Aug. 17, 1994 (now U.S. Pat. No. 5,808,285); application Ser. No. 08/365,193 filed Dec. 28, 1994 (now U.S. Pat. No. 5,557,093); application Ser. No. 08/293,493 filed Aug. 19, 1994 (now U.S. Pat. No. 5,525,789); application Ser. No. 08/573,949 filed Dec. 18, 1995 (now abandoned); application Ser. No. 08/561,479 filed Nov. 20, 1995 (now U.S. Pat. No. 5,661,292); application Ser. No. 08/278,109 filed Nov. 24, 1993 (now U.S. Pat. No. 5,484,992); application Ser. No. 08/489,305 filed Jun. 9, 1995 (now abandoned); application Ser. No. 08/476,069 filed Jun. 7, 1995 (now U.S. Pat. No. 5,591,953); and application Ser. No. 08/584,135 filed Jan. 11, 1996 (now U.S. Pat. No. 5,616,908).

Ser. No. 08/943,267 is a continuation of application Ser. No. 08/865,257 filed May 29, 1997 now U.S. Pat. No. 6,460,767, which is a continuation of application Ser. No. 08/475,376 filed Jun. 7, 1995 (now U.S. Pat. No. 5,637,852), which is a continuation of application Ser. No. 08/365,193 filed Dec. 28, 1994 (now U.S. Pat. No. 5,557,093), which is a continuation of application Ser. No. 08/036,314 filed Mar. 24, 1993 (now abandoned), which is a continuation of application Ser. No. 07/580,738 filed Sep. 10, 1990 (now U.S. Pat. No. 5,216,232).

Ser. No. 08/850,295 is a continuation of application Ser. No. 08/439,224, filed May 11, 1995 (now U.S. Pat. No. 5,627,359).

Ser. No. 08/827,118 is a continuation of application Ser. No. 08/584,135, filed Jan. 11, 1996 (now U.S. Pat. No. 5,616,908).

All of the aforesaid applications are commonly owned by Metrologic Instruments, Inc., of Blackwood, N.J.

BACKGROUND OF THE INVENTION

1. Field of the Invention

The present invention relates to bar code scanners in general and, more particularly, to an improved hand-held laser bar code scanner having an improved compact, ergonomic scanner housing for use in a variety of scanning environments.

2. Description of the Background

Bar code symbols have been widely used for years in many environments, including point-of-sale (POS) stations in retail stores and supermarkets, inventory management, document and parcel tracking, and other diverse data acquisition applications. To meet the growing demands of users of bar code technology, bar code symbol readers of various types and constructions have been developed for scanning bar code symbols on objects and producing symbol character data for use as input in an automated data processing system, including hand-held bar code readers, in-counter or pass-through bar code readers, and presentation type bar code readers. These different types of readers can be either single-line, in that a single scan line is produced for reading bar codes on an object when the bar code is in a particular orientation with respect to the single scan line, or omnidirectional, in that the bar code can be read regardless of its orientation with respect to the multi-line scan pattern.

In general, prior art hand-held, laser based, single-line bar code symbol readers can be classified into two major categories. The first category includes laser hand-held scanners that have a manually-activated trigger mechanism for initiating laser scanning and bar code symbol reading operations. In use, the scanner is held in front of the object bearing a bar code symbol and the scanner head is aimed at the bar code symbol. The user then manually activates the scanner to initiate reading by pulling or depressing a trigger mechanism on the housing of the bar code scanner. When the scanner has successfully read the bar code, the laser is turned off and cannot be reactivated without a second pull of the trigger. Prior art bar code symbols readers illustrative of this first category are disclosed in U.S. Pat. Nos. 4,575,562; 4,825,057; 4,387,297; 4,409,470; 4,593,186; 4,897,532, 4,806,742; 4,835,374; 5,017,765; 5,047,617; 5,021,641; 5,180,904; 5,247,162; 5,468,949; and 5,600,121.

These types of scanners are typically gun-shaped so that the user can aim the scanner head and scanner window (or aperture) at the bar code to be scanned, and pull the trigger to activate the laser, the scanning mechanism and other components of the scanner as necessary. However, there are drawbacks to such a manually activated system including: the requirement that the user must pull the trigger for each scan, whether or not it is the same bar code; the potential for repetitive stress injuries from repetitively pulling the trigger to activate the scanner; and the inability to use a triggered scanner in a hands-free presentation mode without adding extra components or requiring the scanner to be turned on for long periods of time resulting in a decrease in laser life and an increased risk of injury.

The second category of laser hand-held bar code symbol readers includes scanners that have automatically-activated mechanisms (i.e. triggerless) for initiating laser scanning and bar code reading operations. In use, the scanner is held in front of the object bearing a bar code symbol and the scanner head is aimed at the bar code symbol. The mechanism for automatically activating the scanner detects either the presence of an object, the presence of a bar code, or both. Once the presence of an object and/or bar code is detected, laser scanning is initiated and the bar code symbol is read. A variety of mechanisms for automatically activating a bar code scanner have been disclosed in the prior art, including an infrared beam, a low-power laser beam, and an ultrasonic beam. Prior art devices illustrative of this second category of hand-held laser scanners are disclosed in U.S. Pat. Nos. 4,639,606; 4,933,538; 5,340,971; 5,340,973; 5,424,992; 5,468,951; 5,484,992; 5,528,024; 5,525,789; 5,661,292; 5,742,043; 5,796,091; 5,798,730; and 5,828,048.

Automatically activated scanners solve many of the problems found in traditional triggered scanners. There is no need to constantly reactivate the scanner between scans. There is no risk of repetitive stress injuries because no triggered is pulled. Automatically activated scanners can easily be used in a hands-free presentation mode because the activation mechanism works in both a hand-held or hands-free mode. However, there are drawbacks to the automatic scanners as well.

It can be difficult to employ automatic scanners in a crowded POS environment where there is a high chance of inadvertently scanning unwanted items. Bar code menus such as are often found at home improvement and hardware stores present one type of situation where an automatic scanner is at a disadvantage. Also, moving the automatic scanner across a counter area crowded with objects may produce an unwanted scan when the scanner automatically detects an object.

Some of these disadvantages of automatic scanners have been resolved by employing a data transmission switch such as the one disclosed in U.S. Pat. No. 6,283,375, which is commonly assigned to Applicant, Metrologic Instruments, Inc., and is incorporated herein by reference thereto. The data transmission switch disclosed in U.S. Pat. No. 6,283,375 allows a user of an automatic scanner to transmit decoded scan data to the host only upon the manual activation of a data transmission control signal by the user. The control signal is the form a switch located on the scanner housing that is depressed by the user when the scan line produced by the scanner is positioned over the bar code symbol that is to be acquired. When the switch is depressed the decoded scan data representative of the desired bar code is then transmitted to the host for further processing.

The present application provides for a scanner that is compact in construction, employs a modular type of construction for ease of manufacture and includes an improved scanner housing for a laser bar code symbol reader that incorporates either a manually activated trigger or an automatic trigger with a data transmission switch that is integrated into the scanner housing with an LED display. The improved scanner housing further incorporates an integrated scanner stand to allow the scanner to rest on a flat surface and provide for a finger-accommodating recess to allow a user to easily pick up the scanner for use.

The positioning of the data transmission switch on the upper side of the scanner head portion in conjunction with the angle of the scanner housing between the scanner head portion and the scanner handle portion provides the user with an ergonomically correct position for depressing the data activation switch.

Consequently, it would be greatly advantageous to provide a compact scanner configuration capable of providing a greater degree of ergonomic comfort and control over the bar code symbol reading processes to ensure aggressive hand-supported scanning by a user.

SUMMARY OF THE INVENTION

It is, therefore, an object of the present invention to provide an improved bar code scanner of compact size, configured with an integrated scanning head and stand, the entire unit being capable of economical manufacture.

It is still another object to provide a bar code scanning system having an improved ergonomic compact housing for hand-held use in which the scanner housing is contoured to fit the hand of the user.

It is another object to provide for a scanner having an integrated stand to provide for a secure foundation that allows the scanner to be the free-standing.

It is still another object to incorporate an aggressive and reliable single-line scan engine platform in a housing as described above, the resulting system being capable of an aggressive single-line scan while hand-held by a user.

Another object of the present invention is to provide an automatically-activated laser scanning bar code symbol reading system and method which provides the user with a greater degree of ergonomic control over the disposition of the bar code symbol reader during automatically initiated bar code symbol reading.

Another object of the present invention is to provide an automatically-activated code symbol reading system which includes a bar code symbol reading mechanism contained within a hand-supportable housing having a manually-activatable data transmission control (activation) switch, and wherein the bar code symbol reading mechanism automatically generates a visible laser scanning pattern for repeatedly reading one or more bar code symbols on an object during a bar code symbol reading cycle, and automatically generating a new symbol character data string in response to each bar code symbol read thereby.

Another object of the present invention is to provide such an automatically-activated code symbol reading system, wherein a set of color-encoded light sources is provided on the system housing for sequentially generating a set of visually-perceptible state indication signals, and wherein audible signals are likewise generated, such that operation of the scanner becomes simple and convenient, and wherein each bar code symbol reading cycle is visually and audibly signaled to the user.

Another object of the present invention is to provide: a visual and/or audible object detection indication signal when the system detects that an object is within its object detection field; a visual and/ot audible bar code detection indication signal when the system detects a bar code symbol in its bar code detection field; a visual and/or audible bar code reading indication signal when the system reads a detecte bar code symbol in its bar code symbol reading field; and a visual and/or audible symbol character data transmission indication signal when the user manually-activates the data transmission control switch on tl exterior of the scanner housing so as to enable transmission of automatically produced bar code symbol character data to the host processor and/or internal or external data storage device of the system. Another object of the present invention is to provide such an automatically-activated laser scanning bar code symbol reading system, wherein the control subsystem thereof enables the transmission of produced symbol character data to the associated host system or data storage device, only when the data transmission control switch provided on the exterior of the scanner housing is manually activated by the user during a bar code symbol reading cycle.

Another object of the present invention is to provide an automatically-activated bar code symbol reading system which comprises an automatically-activated laser scanning bar code symbol reading device having (i) a hand-supportable or surface-supportable housing, (ii) a preprogrammed set of operational states where through the system automatically passes during each bar code symbol reading operation, without requiring manual activation of a switch, trigger or like component within the system, and (iii) a preprogrammed symbol character data transmission state of operation into which the system is automatically induced in response to manual-activation of a data transmission control switch provided on the exterior of the housing of the bar code symbol reader.

Another object of the present invention is to provide such an automatically-activated bar code symbol reading system, wherein the preprogrammed set of operational states include an object detection state of operation, a bar code presence detection state of operation, and a bar code symbol reading state of operation, wherein each of these states of operation are automatically activated in response to the automatic detection of predetermined conditions in the object detection field, bar code symbol detection field and/or bar code reading field of the system.

Another object of the present invention is to provide such an automatically-activated bar code symbol reading system, wherein the objection detection is carried out using either infrared (IR) signal transmission/receiving technology, or low-power non-visible laser beam signaling technology, which automatically generates an object detection field that is spatially-coincident with, or spatially encompasses at least a portion of the bar code symbol detection and reading fields during the object detection state of system operation.

Another object of the present invention is to provide such an automatically-activated bar code symbol reading system, wherein the visible laser scanning beam is scanned along a one-dimensional scanning pattern within the bar code detection field and bar code reading field of the system.

Another object of the present invention is to provide a portable, fully automatic bar code symbol reading system which is compact, simple to use and versatile.

According to the present invention, the above-described and other objects are accomplished by providing a compact scanner including a hand-supportable housing with a scanning head portion for housing a scanning module, and a handle portion for gripping by the user and for housing a control module. The head portion has a forward aperture for projecting a scanning pattern therefrom and receiving reflected light therethrough, a scan window seated across the aperture, and a rubber bumper conforming to the scan window and projecting forwardly therefrom for protecting the scan window. The handle portion is integrally joined at an angle to the head portion and conforms to the hand of the user for support therein. A scanning module is mounted in the head portion of the housing for producing scan data from a bar code symbol on an object located in a laser scanning field in advance of the head portion. A control module is mounted in the handle portion of the housing and is connected to the scanning module for processing the scan data produced thereby. The control module includes a manually-activatable data transmission micro-switch for producing a control activation signal, and a thumb-switch is mounted on the upper portion of the hand-supportable housing. The thumb-switch is in operative engagement with the data transmission switch on the control module and is positioned for convenient thumb-activation of the data transmission mode when a user grips the handle of the housing. In addition, the housing includes a pair of integrally formed balancing feet, which protrude downwardly from the bottom of the handle portion of the scanner housing to provide a stable support in conjunction with a lower lip of the rubber bumper, thereby allowing the user to rest the scanner on virtually any surface. A crescent indicator window is mounted atop the housing, faces backward toward the user, and partially encircles and accentuates the thumb switch for visible, accessible, and convenient single-handed operation, feedback and control of the symbol reading system.

The resulting scanning system as a whole permits an aggressive omnidirectional scan from a free-standing fixed position atop a counter or while hand-held by a user.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
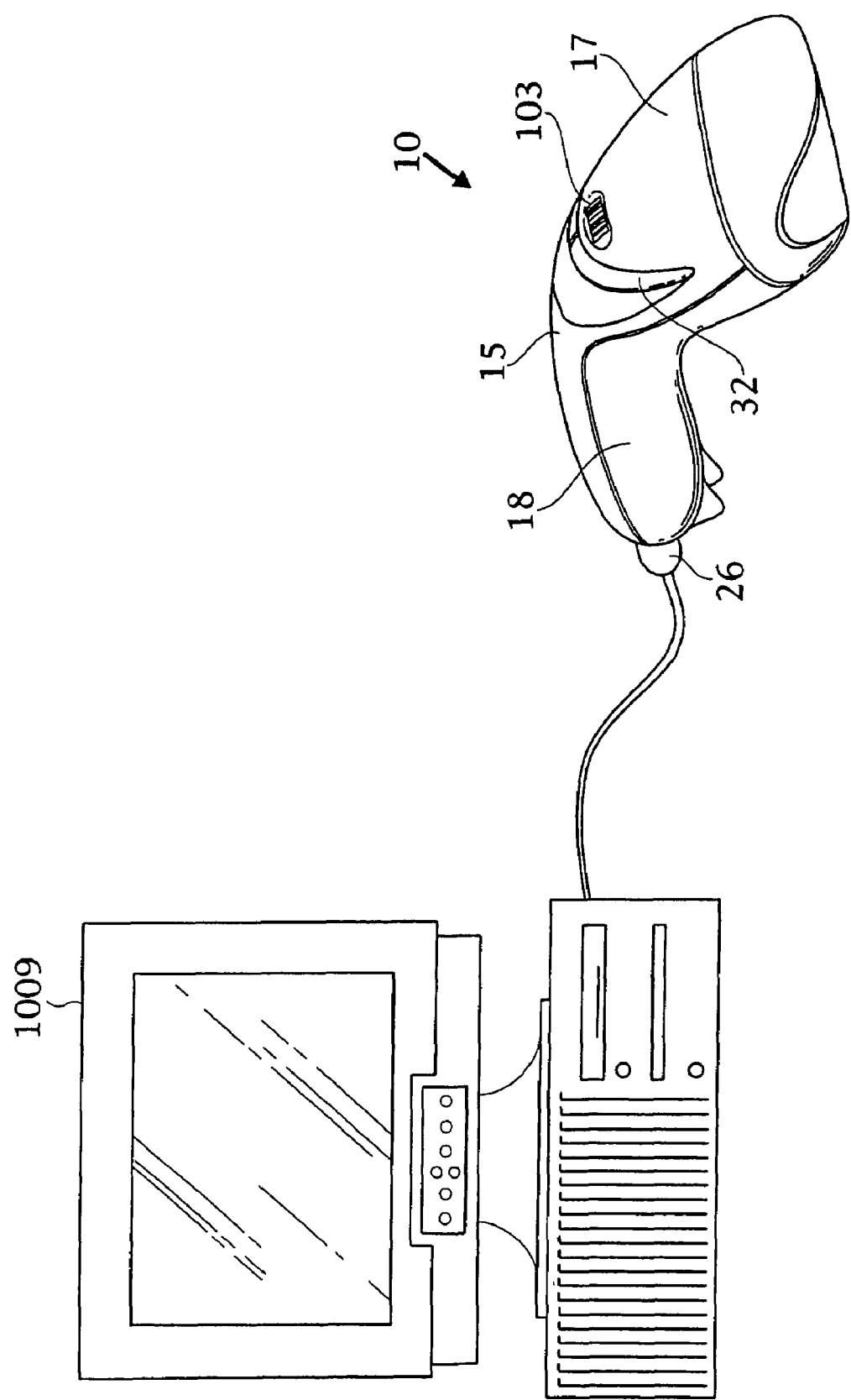
FIG. 1 is a perspective view of a hand-held compact laser scanner 10 having a single-line laser scanning platform mounted in the head portion of a hand-supportable/free-standing housing according to one embodiment of the present invention.
Figure 2:
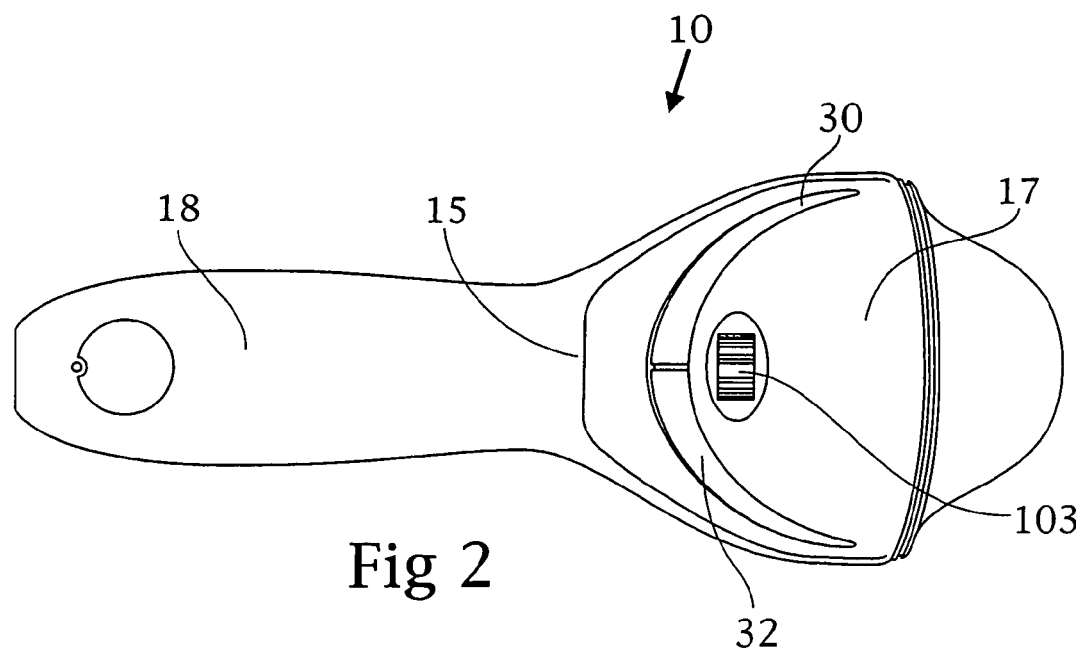
FIG. 2 is a side view of the hand-held compact laser scanner 10 as in FIG. 1.
Figure 3:
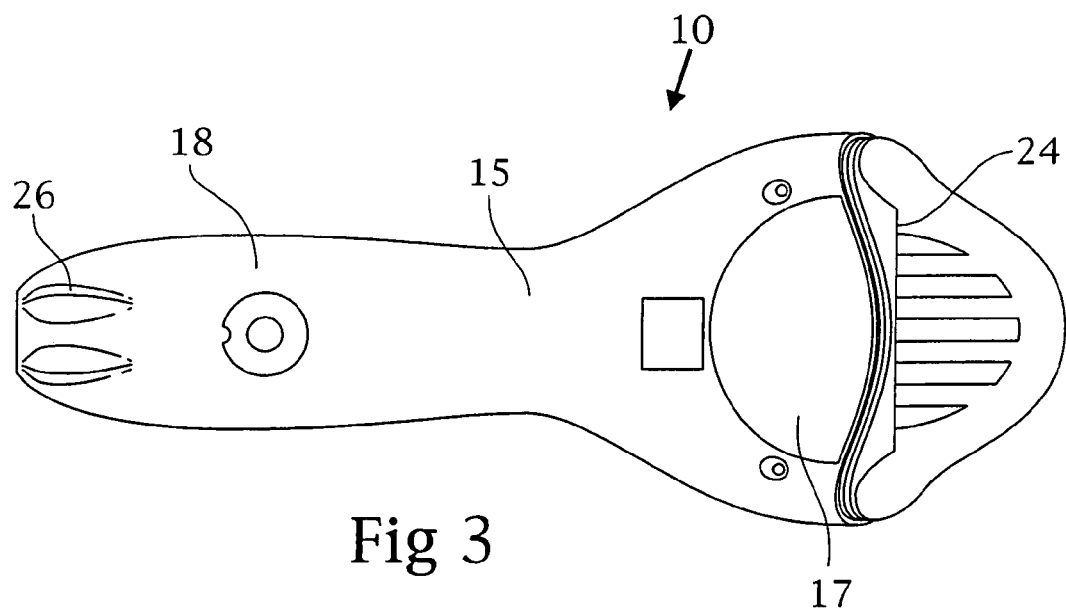
FIG. 3 is a top view of the hand-held compact laser scanner 10 as in FIGS. 1-2.

FIGS. 1-3 are a perspective view, side view and top view of a hand-held compact laser scanner 10 according to one embodiment of the present invention. The compact laser scanner 10 as shown in FIG. 1 incorporates a laser scanning engine 501 mounted inside a hand-supportable/free-standing housing 20. During bar code symbol reading operations, the compact laser scanner 10 automatically generates a visible laser scanning pattern for repeatedly scanning one or more bar code symbols on an object within a bar code symbol reading cycle, and automatically generates a symbol character data string in response to each bar code symbol read thereby. After the bar code symbol reading cycle, manual activation of a data transmission switch 103 integrated into the top section of the hand-supportable housing 20 generates a data transmission control activation signal, thereby enabling a bar code symbol character data string to be selected and transmitted to a host system 1009. A crescent-shaped indicator window 30, that forms a portion of the integrated data transmission switch, covers an array of LEDs which signal the operational status of the scanner 10 to the user. As will be seen, the robust laser scanning engine 501 combined with the ergonomic configuration of housing 20 provides a hand-held compact laser scanner 10 which is well-suited for reading diverse types of a bar code symbols on bar code menus, consumer products positioned in crowded POS environments, and other objects requiring automatic identification and/or data acquisition and processing. The intuitive controls (inclusive of layout of data transmission switch 103 and the indicator window 30) are easy to use and economical to manufacture and assemble in housing 20. Moreover, the particular configuration of compact hand-supportable/free-standing housing 20 allows the user to set the scanner 10 down on virtually any surface without risk of damage.

Housing 20 is multi-part and generally defined by a head portion 17 and a handle portion 18. The housing 20 is formed with a combination of curved and/or tapered surfaces producing an ergonomic configuration in which the handle portion 18 flows at an angle into the head portion 17, which in turn leads to a front window 24 (obscured in FIGS. 1-3, see FIG. 4), and which places the top-mounted crescent-shaped indicator window 30 facing backward toward the user and partially encircling and accentuating the data transmission switch 103. This provides a most visible, accessible, and ultimately convenient configuration for single-handed operation, feedback and active control of scanner 10.

The data transmission switch 103 is integrated into the top section of the hand-supportable housing 20 in the form of a manual detent button within the arc of the crescent-shaped indicator window 30. The manual detent button is formed integrally in the head portion of the housing 20 as a continuous piece of molded plastic. This is accomplished by forming the manual detent button 103 as a resilient area in the housing, for example, a thin-walled area of the molding with surface features delineated by ribs, texture, or other markings to convey the fact that is indeed a switch. This allows the data transmission switch 103 to be manually depressed into engagement with a corresponding microswitch on the system control module 601, thereby initiating data transmission to a host system. The integration of the data transmission switch 103 into the housing 20 such that the housing and the switch are formed of a single piece of molded plastic makes the scanner unit 10 easier to manufacture by eliminating the need for separate molded part to serve the function of the switch.

Additionally, by incorporating the data transmission switch 103 into the top section of the housing 20, a user can activate the switch 103 more easily by pressing anywhere on the top portion of the housing. Thus, it becomes much easier to activate than a standalone slide or detent switch where aim and finger dexterity become factors. Moreover, because the switch 103 is integrally molded with the top-section of the housing the motion of the switch 103 is limited by the flexibility of the material out of which the housing 20 is made. This prevents the switch 103 from being damaged as a result of excess pressure exerted by a user. The top-mounted position of the switch 103, versus the prior art method of having a switch mounted in the handle portion requiring action of a trigger finger to pull the switch, provides for a more natural and ergonomic placement of the user's hand and fingers during normal scanning operations. The top-mounted position of the data transmission switch 103 allows for thumb-activation.

The further integration of the scanner's LED indicator window 30 as a part of the switch provides the user with a visual indication of the acquisition of the bar code data so that the data transmission switch 103 may be depressed at the appropriate time.

A rearward portal 26 is provided in the handle portion 18 (i.e. at the distal end of the housing 20) for a cable connection of remote power supplied by the host computer system 1009 to the scanning engine circuitry located in both the handle portion 18 and head portion 17 and a data communications interface connection. The handle portion 18 of the scanner 10 is generally cylindrical and is contoured to fit the palm of the user's hand.

Figure 4:
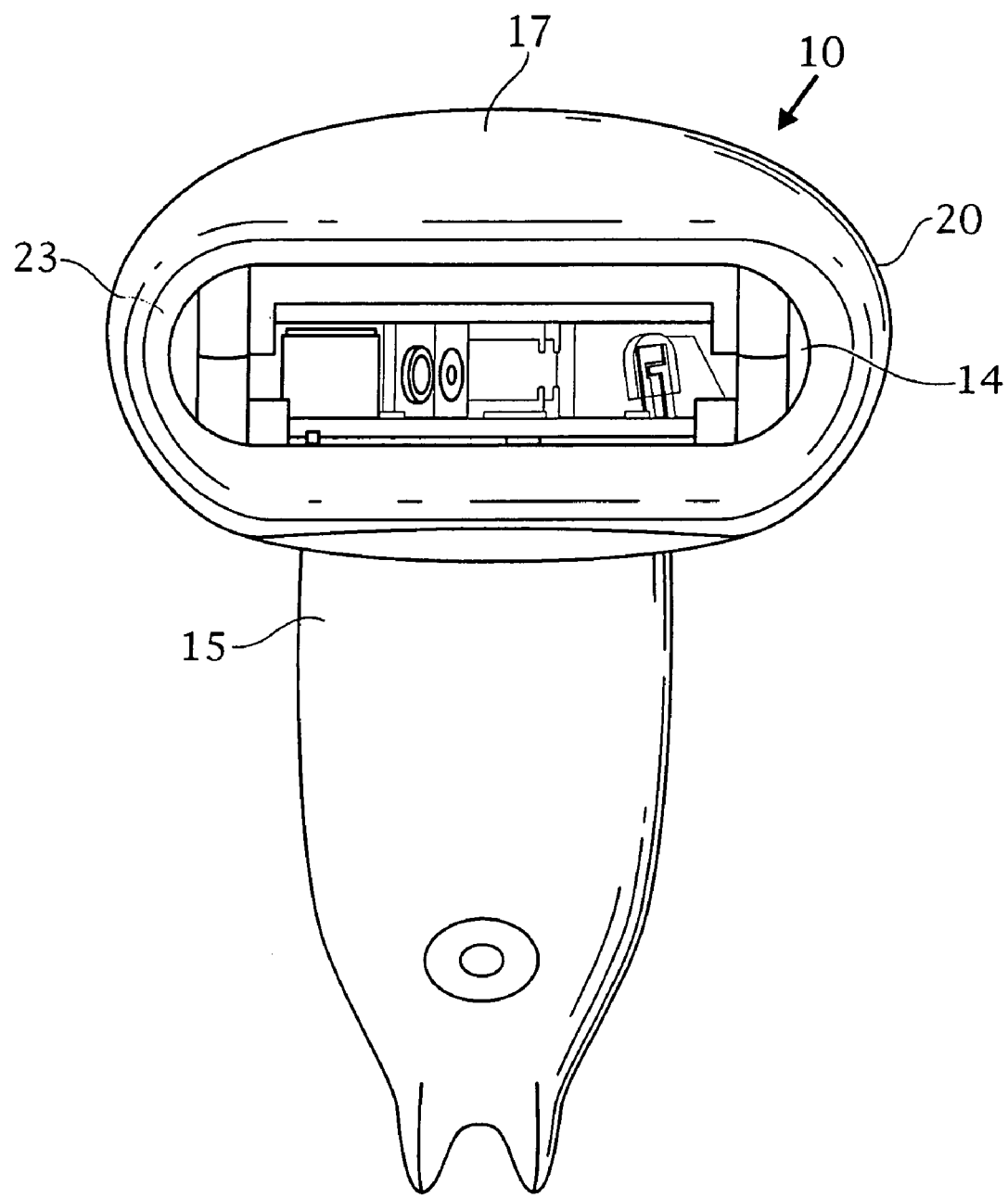
FIG. 4 is a front view of the hand-held laser scanner 10 of FIG. 1.

FIG. 4 is a front view of the hand-held laser scanner 10 of FIGS. 1-3. The front of the scanning head portion 17 is formed in a generally oblong configuration giving full exposure to the flat front scanning window 14. The scanning window 14 is likewise oblong in configuration and is mounted in the aperture formed at the front of the scanner housing 20 in a groove formed in the housing behind a front window bumper 23, said bumper 23 being mounted exteriorly at the face of the scanning head portion 17 to provide for shock resistance of the scanner head portion, the integrated scan engine, and protection of the scan window. The window 14 is an oblong section of acrylic-type plastic that can be red tinted such that it has optical filtering properties such as described in detail in U.S. Pat. No. 5,627,359 (the '359 patent being commonly owned by Metrologic Instruments, Inc. and incorporated herein by reference).

The entire housing 20 may be molded of hard plastic or the like, and in this case is preferably formed in two half-sections (both upper housing and lower housing sections) with tongue-and-groove edges for a secure interlocking fit that prevents dust or other contaminants from entering the housing. The scanning window 14 is mounted interiorly within the front aperture at the front of the scanning head section 17. The rubber bumper 23 is in turn mounted exteriorly on the front of scanning head portion 17 to protect the window 14, the scanner housing and scan engine.

Figure 5:
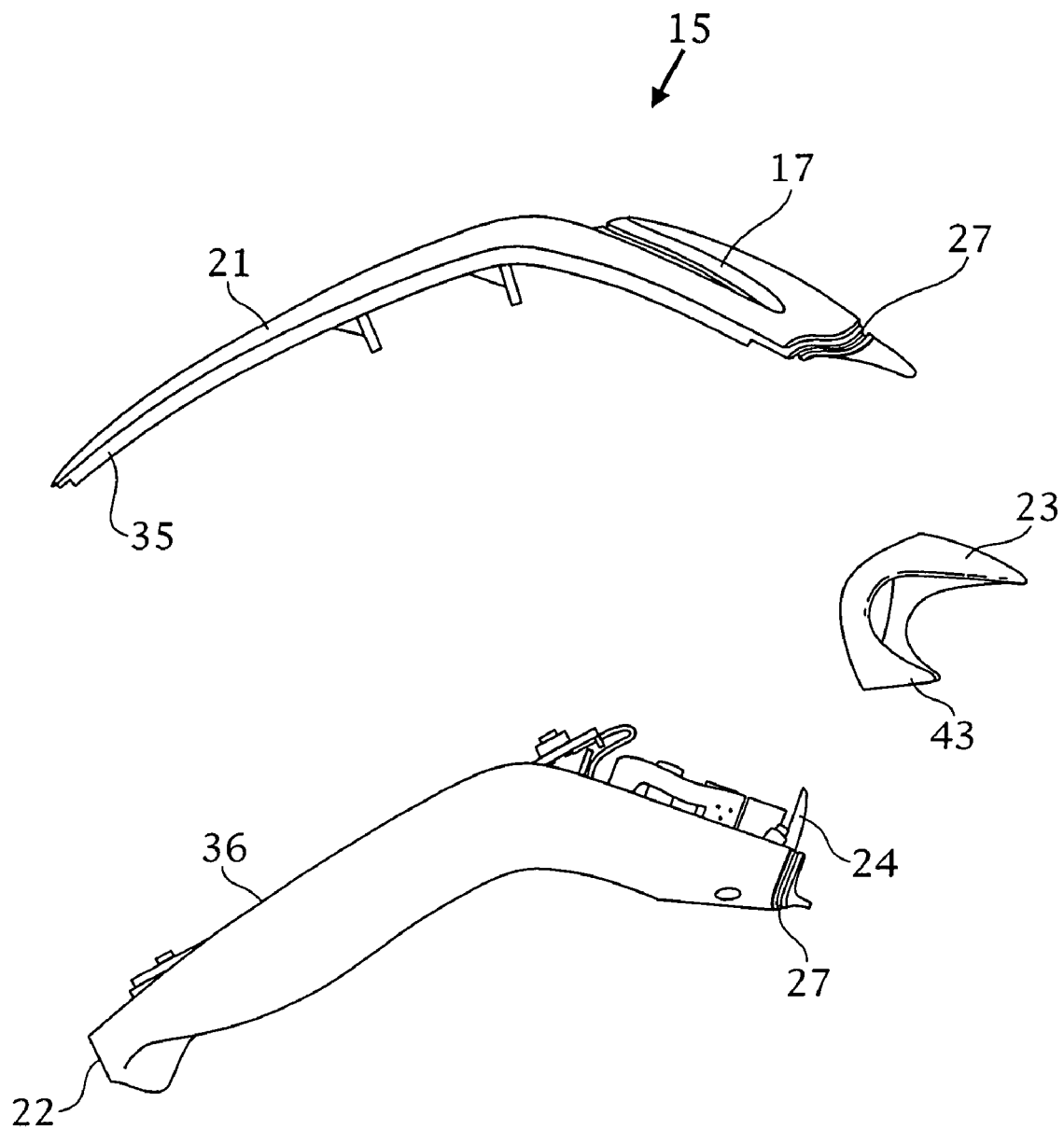
FIG. 5 is a side perspective, exploded view of the housing 20.

FIG. 5 is a side perspective, exploded view of the housing 20 showing the upper housing 21, the lower housing 22, the rubber bumper 23 with its lower lip 43, and the window 24. The upper housing section 21 and the lower housing section 22 of the housing 20 are preferably molded of hard plastic or the like, with tongue-and-groove edges 35, 36 for an interlocking fit. A rim 27 located at the front end of and encircling the head portion 17 is utilized to hold the rubber bumper 23 in place. The window 14 is preferably seated at a slight angle within a defined groove that circumscribes the interior of both the upper housing 21 and the lower housing 22, to avoid potential scanning errors that can be associated with specular reflection caused by return light. Window groove 24 is inset slightly in the head portion 17 of housing 20, and the extended molded rubber bumper 23 provides a protective ring which projects out in front of the window 24. This configuration offers a high degree of protection to window 24 against contact with all but direct projectiles.

The compactness of housing 20 is in part due to a split circuitry design in which the scanning circuitry for signal processing and decoding is resident on two separate circuit boards, one resident in the handle portion 18 and the other being resident in head portion 17. The two circuit boards are electrically connected by a flexible cable connector. More specifically, the head portion 17 of housing 20 encloses a scanner module 501 which is a unitary electro-optical module with resident optical and electronic components (to be described) that collectively produce a shaped laser beam, scan the laser beam into the scan field, receive returned light from the scan field, and detect and process the returned light. The head portion 17 of the housing has integrally molded tabs and spacers for seating and aligning the module 501 in position with and directly behind the scan window 14.

The handle portion 18 of housing 20 encloses a system control module 601 which includes a unitary circuit board containing the control circuitry (to be described) inclusive of various resident sub-systems for encoding the scanned bar code, transmission of the encoded data to host system 1009, allowing user-programming of the operating characteristics and modes of the scanner 10, LED mode indicators and a data transmission contact switch, all of the foregoing being operably connected to the system control subsystem described above. The handle portion 18 also includes integrally molded tabs and spacers in housing 20 for securely mounting the system control module 601.

As can be seen, the design of the scanner 10 integrates the housing 20 and the entire laser scanning engine 501 (inclusive of all associated optical and electronic components) in a compact ergonomic hand-supportable unit. The scanner 10 is capable of an aggressive scan while being supported in the hand of a user.

Figure 6A:
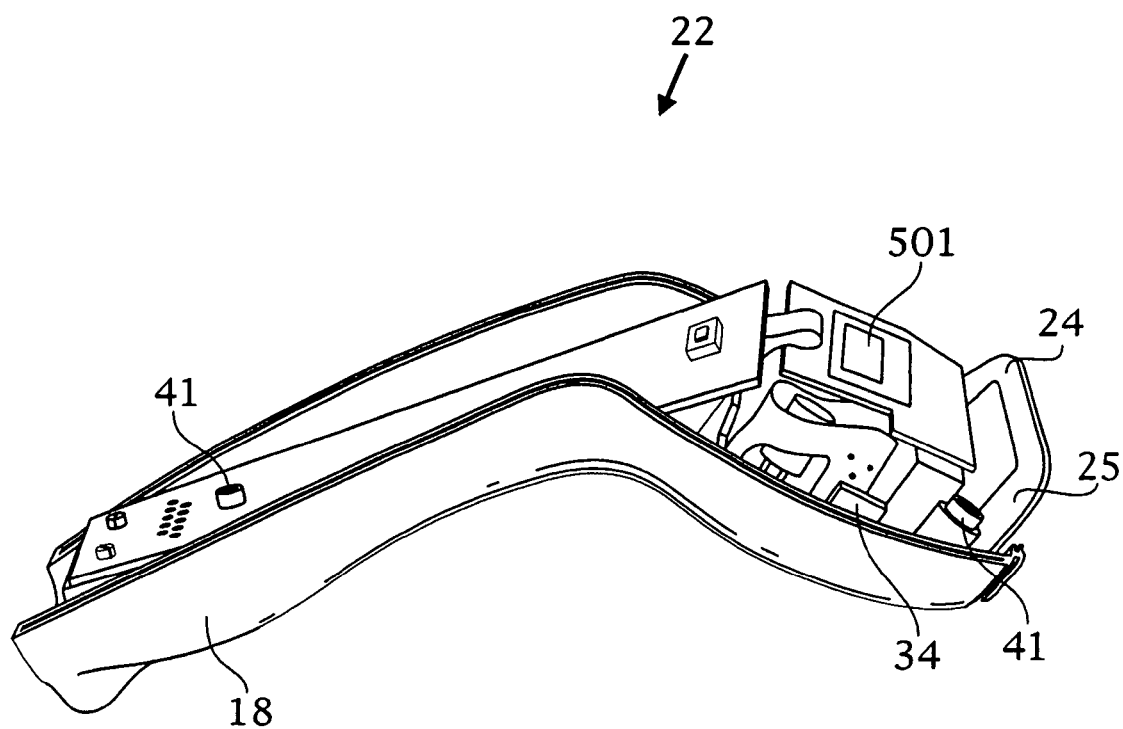
FIG. 6A is a side perspective view (looking inside)
Figure 6B:
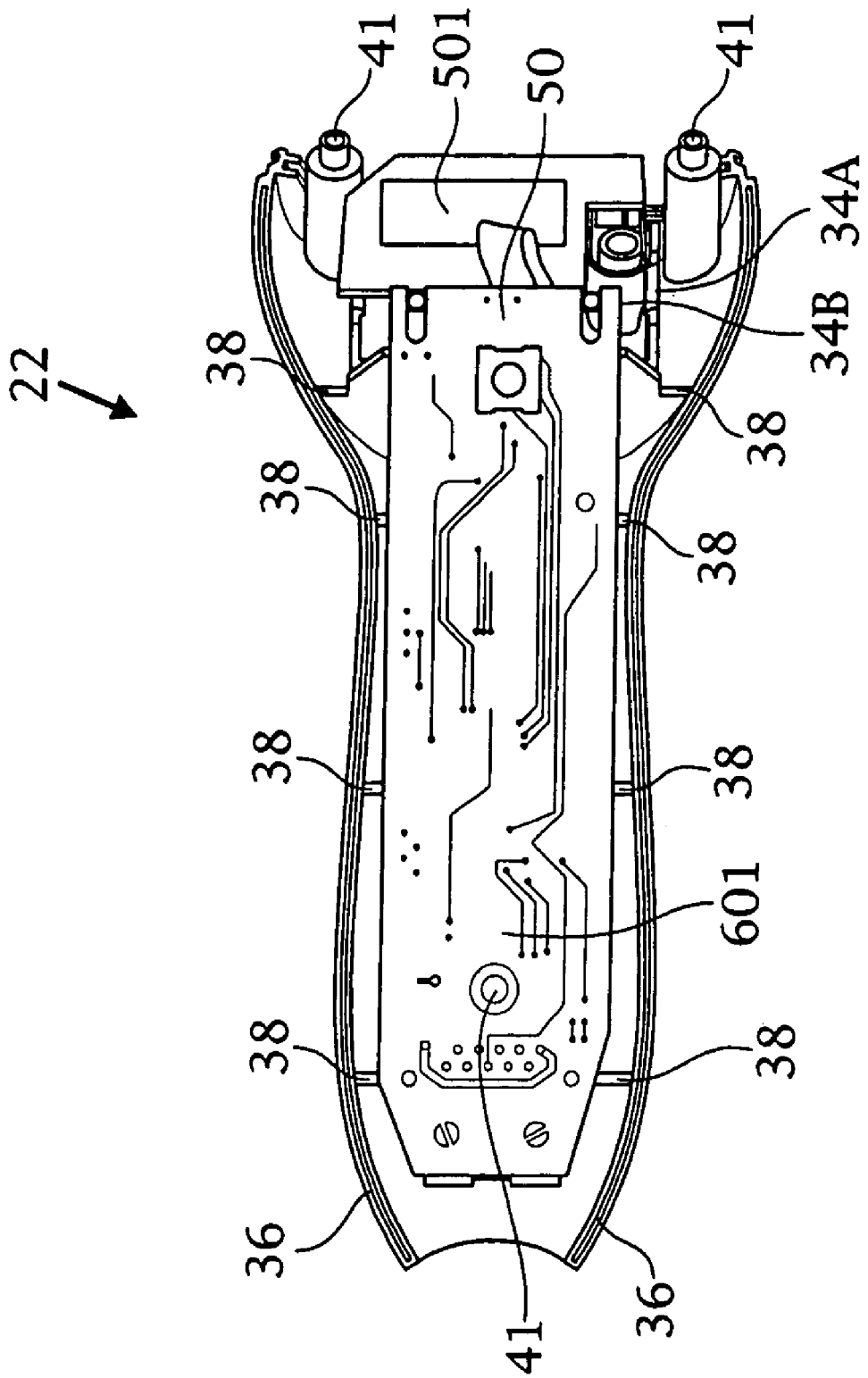
FIG. 6B is a top perspective view of the lower housing 22 of FIG. 5.

FIG. 6A is a side perspective view (looking inside), and FIG. 6B is a top perspective view of the lower housing 22 of FIG. 5. The lower housing 22 is preferably molded of hard plastic or the like (a like material to the upper housing 21). An internal framework of struts 38 is provided to improve the structural integrity of the lower housing 22. Struts 38 also collectively cradle the scan module 501 and system control module 601 within housing 20. Specifically, the struts 38 in the head portion 17 of housing 20 form a bench 34 for mounting the scan module 501, and those struts 38 in the handle portion 18 form a bench 35 for supporting the system control module 601 of laser scanning engine 50. Both the scan module 501 and system control module 601 are seated in the lower housing 22, at an angle to each other. The lower housing 22 is formed with three hollow cylindrical posts 41 (two opposing posts 41 located in the head portion 17 directly behind the window 24 and groove 25, and one located toward the other end in the handle portion 18). Each hollow post 41 is formed with tongue-and-groove edges 36 surrounding its distal end for a telescoping fit with mating posts 41 in the upper housing 21. In addition, the central cavity in each hollow post 41 in the lower housing 22 extends all the way through the bottom of the lower housing 22 and opens outward, thereby allowing insertion of machine screws to facilitate secure attachment of the housing sections to each other.

As shown in FIG. 4, in accordance with the present invention, two balancing feet 42 are integrally molded on the lower housing section 22 directly below the rearward portal 26 (utilized to pass electrical cabling). When the scanner 10 is fully assembled (as in FIG. 1), the balancing feet 42 in combination with the lower lip 43 of the rubber bumper 23 (see FIG. 5) provide a stable base for resting the scanner 10 on virtually any surface. The integrated scanner stand formed by combination of the balancing feet 42 and the lower lip 43 of the rubber bumper 23, coupled with the high coefficient of friction of the rubber bumper 23 serves to anchor the scanner 10 and prevents accidental damage or scratching of the window 14.

Figure 7:
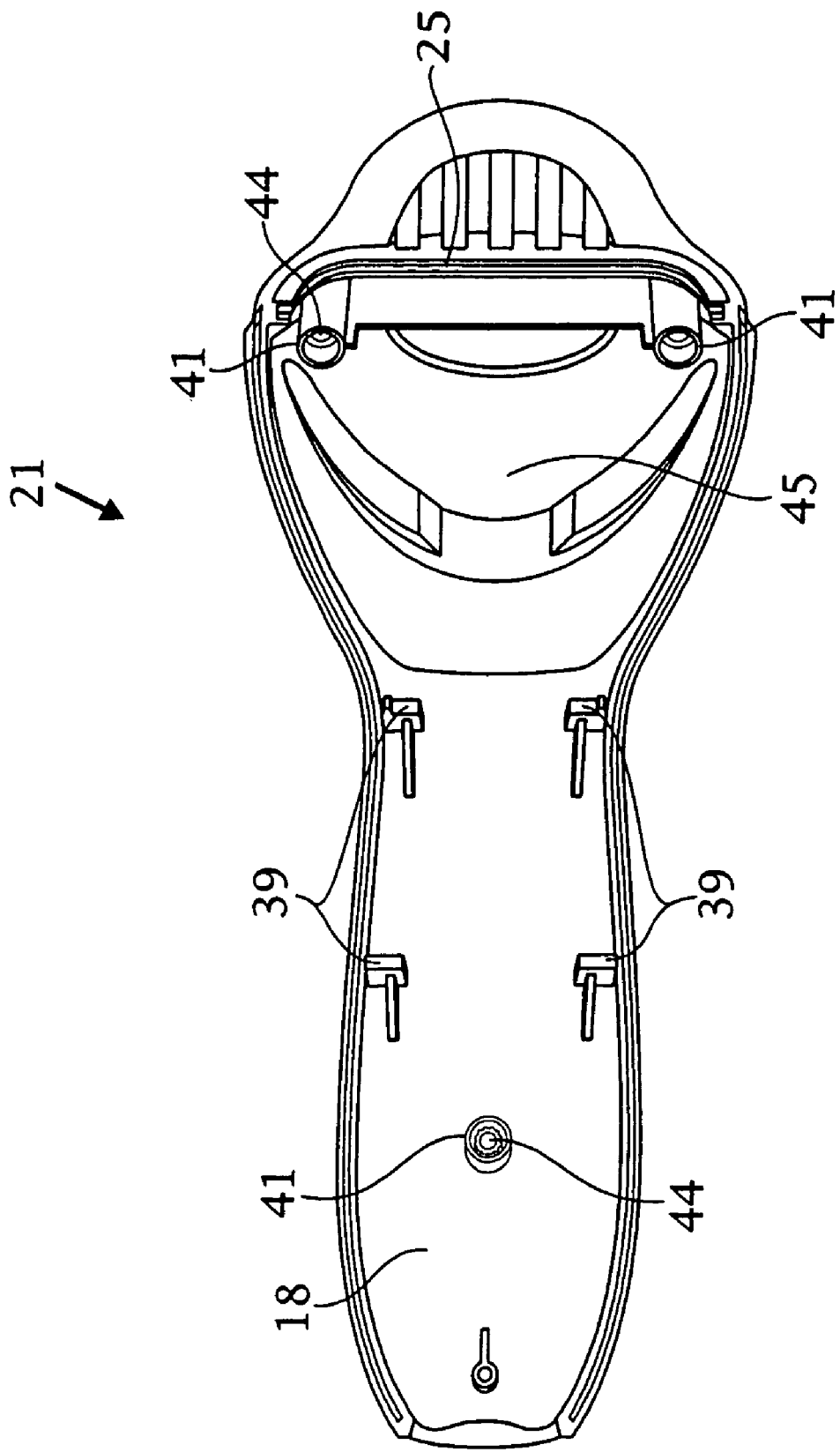
FIG. 7 is a perspective view of the inside of upper housing 21.

FIG. 7 is a perspective view of the inside of upper housing 21. An internal framework of struts 39 is provided to improve the structural integrity of the upper housing 21 and to facilitate mating with the lower housing 22. The posts 41 in the upper housing 21 seat three assembly screw anchors 44 (two located directly behind the window groove 25, one located toward the end of the handle portion 18) to facilitate the screw attachment of the lower housing 22. The data transmission switch 103 is formed by a section 45 of the housing 21 that flexes inward slightly when pressure is applied, thereby depressing a micro-contact switch 35a which is resident on the system control module 601. The crescent indicator window 30 is fronted by a transparent plastic member 105 positioned adjacent the data transmission switch 103 in the upper housing section 21. The plastic member 105 may be formed of a molded pane that conforms to the interior of the upper housing 21, and which directs light from an array of LEDs on the system control module 601 outward and rearward to the user for visually signaling the operational status of the scanner 10.

The window 14 of FIG. 4 is inset in the head portion 17, and the rubber bumper 23 provides a protective ring projecting out in front of the window 14. The rubber bumper 23 is formed as a one-piece rubber member and is designed for removable attachment to the head portion 17. To this end, the bumper 23 is formed with a flared annular lip 26 (having an upper section 46 and a lower section 43) and a locking rib 28 spaced a short distance behind. The flared annular lip 26 of the rubber bumper 23 generally conforms to the curvature of the head portion 17 (see FIG. 5). Locking rib 28 fits behind the rim 27 (see FIG. 5) of the head portion 17, thereby locking the rubber bumper 23 in place. This particular configuration of rubber bumper 23 mates flush with and preserves continuity with the head portion 17 and gives an aesthetically pleasing appearance while protecting the recessed plastic window 14 against damage when dropped or banged.

The compact housing 20 described above yields a convenient, durable and ergonomic scanner package. Thus, the scanner 10 is structurally capable of an aggressive omnidirectional scan while being hand supported by a user. The utility of the housing 20 is matched by an aggressive and reliable omnidirectional laser scanning engine as will be described.

The scan module 501 (including all associated optical components as will be described) is mounted in the head portion 17 and remains under the control of the system control module 601 which is seated in the handle portion 18 of the scanner 10. The scan module 501 projects a single scan line through the front window 24 onto a bar code to be read, receives reflected light therefrom, and sends the information to the system control module 601 which decodes the bar-coded information from the reflected light.

Figure 8:
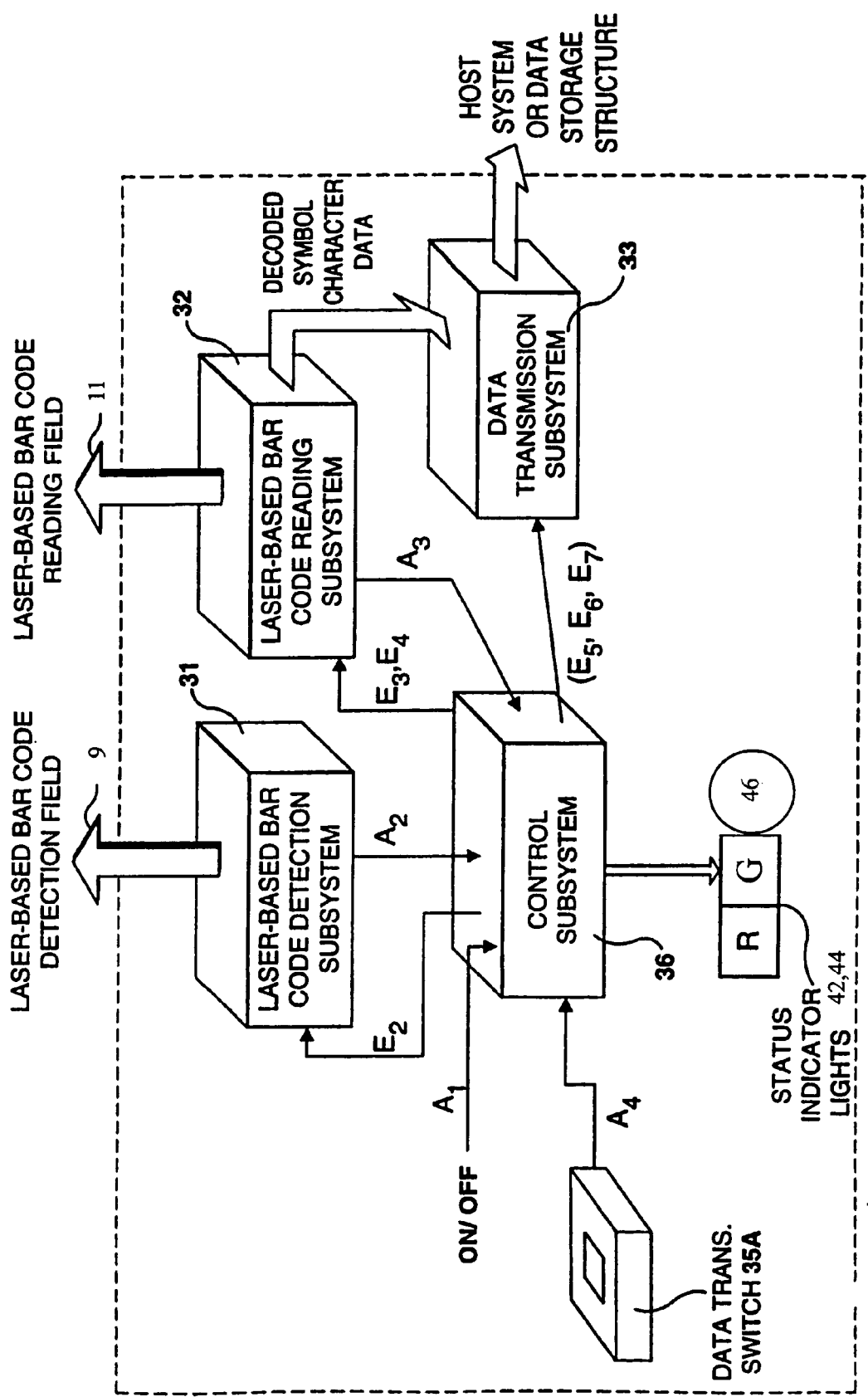
FIG. 8 is a schematic representation of an illustrative embodiment of the bar code symbol reading device of the present invention, showing the major subsystem components thereof as comprising a laser-based bar code symbol detection subsystem 31, a laser-based bar code symbol reading subsystem 32, a data transmission subsystem 33, and a system control subsystem 36.

FIG. 8 is a block diagram of an exemplary single-line laser scanning system suitable for use in the scanner 10 of FIG. 1. It should be understood that there are many alternative scanning engines which can be used to achieve satisfactory results, and any one of these may be substituted for single-line laser scanning system 50 without deviating from the scope and spirit of the present invention. Specifically, PCT Patent Application No. PCT/00/33239 (published) filed by Metrologic, Inc. illustrates twenty-one different scan engine embodiments classified in three different system designs, and in each case activation of the bar code symbol detection and bar code symbol reading operations is carried out in a fully automatic manner, without the use of a manually-activated trigger or like mechanism. Any one of the foregoing scanning engines can be substituted for single-line laser scanning system 50 described herein.

In one embodiment of the scanner, as shown in FIG. 8, the single-line laser scanning system 50 can include a number of subsystems, namely: a laser-based bar code symbol detection subsystem 31; a laser-based bar code symbol reading subsystem 32; a data transmission subsystem 33; a state indication subsystem 134; a data transmission switch 35a which is preferably a micro-contact switch resident on system control module 601 and in engagement with switch 103 on the scanner housing; a mode-selection sensor 135B integrated with the scanner housing in part or whole; and a system control subsystem 36 operably connected to the other subsystems described above. In general, the system 50 can have a number of preprogrammed states of operation, namely: a Bar Code Symbol Detection State; a Bar Code Symbol Reading State; and a Data Transmission State.

Within the context of the system design shown in FIG. 8, the laser-based bar code symbol detection subsystem 31 performs the following primary functions during the Bar Code Symbol Detection State: (i) automatically generates a pulsed visible laser scanning pattern of predetermined characteristics within a laser-based bar code (symbol) detection field 9, defined relative to the scanner housing, to enable scanning of a bar code symbol on an object; (ii) automatically processes scan data collected from the bar code symbol detection field 9 and detects the presence of the bar code symbol thereon; and (iii) automatically generates a control activation signal A2=1 indicative thereof in response to the automatic detection of the bar code symbol. As shown in FIG. 8, the second control activation signal A2 is provided to the system control subsystem 36 for detection, analysis and programmed response.

Within the context of the system design shown in FIG. 8, the laser-based bar code symbol reading subsystem 32 performs the following functions during the Bar Code Symbol Reading State: (i) automatically generates a visible laser scanning pattern of predetermined characteristics within a laser-based bar code (symbol) reading field 11 defined relative to the scanner housing 20, to enable scanning of the detected bar code symbol therein; (ii) automatically processes (decodes) scan data collected from the bar code symbol reading field 11 so as to detect the bar code symbol on an object; (iii) automatically generates a third control activation signal A3=1 indicative of a successful decoding operation, and produces decoded symbol character data representative of the detected and read bar code symbol. As shown in FIG. 8, the third control activation signal A3 is provided to the system control subsystem 36 for detection, analysis and programmed response.

Within the context of the system design shown in FIG. 8, the data transmission subsystem 33 during the Data Transmission State automatically transmits produced symbol character data to the host system (to which the bar code reading device is connected) or to some other data storage and/or processing device, only when the system control subsystem 36 detects the following conditions: (1) generation of third control activation signal A3=1 within a predetermined time period, indicative that the bar code symbol has been read; and (ii) generation of data transmission control activation signal A4=1 (e.g. produced from manually actuable switch 35a) within a predetermined time frame, indicative that user desires the produced bar code symbol character data to be transmitted to the host system or intended device.

Within the context of the system design shown in FIG. 8, the state indication subsystem 134 performs the following functions: automatically monitors the state of operation of the system at each instant of time; and automatically produces visual indication (e.g. color-coded light) signals and audio indication signals from the scanner housing 20 designed to inform the user of the current state of operation of the system (as will be described). As will be described in greater detail hereinafter, such state indication signals provide the user with visual and audio feedback on the states of operation of the system, thereby improving the intuitiveness and facility of operation of the system in diverse application environments.

Within the context of the system design shown in FIG. 8, the system control subsystem 36 performs the following primary functions: (i) automatically receiving control activation signals A1, A2, A3 and A4; (ii) automatically generating enable signals E2, E3, E4, E5, E6, and E7; and (iii) automatically controlling the operation of the other subsystems in accordance with a system control program carried out by the system control subsystem 36 during the various modes of system operation.

In general, the geometrical and optical characteristics of laser scanning patterns generated by the laser-based bar code symbol detection subsystem 31 and the laser-based bar code symbol reading subsystem 32 will depend on each particular embodiment of the bar code symbol reading system of the present invention. In most applications, the laser scanning patterns generated within the bar code detection and reading fields will be substantially congruent, and if not substantially congruent, then arranged so that the bar code symbol reading field spatially-overlaps the bar code symbol detection field to improve the scanning efficiency of the system.

Initially, system control subsystem 36 provides enable signal E2=1 to the laser-based bar code detection subsystem 31. This causes the laser-based bar code detection subsystem 31 to generate a pulsed laser scanning pattern of predetermined characteristics within the laser-based bar code detection field 9. The pulse-on duration of the laser signal is about 50%, while the pulse-off duration is also about 50%. When the laser scanning pattern scans a bar code symbol on an object, scan data signals are produced therefrom, collected, detected and processed to determine whether a bar code symbol has been detected within the bar code symbol detection field 9. If the scanned bar code symbol is detected, then the system control subsystem 36 automatically generates enable signal E4=1 so as to activate the bar code symbol reading subsystem 32. In response thereto, the laser-based bar code reading subsystem 32 automatically generates a visible laser scanning pattern within the laser-based bar code reading field 11, scans the detected bar code symbol disposed there within, collects scan data therefrom, decodes the detected bar code symbol, generates symbol character data representative of the decoded bar code symbol, and buffers the symbol character data in memory. If the detected bar code symbol is read within a predetermined period of time, and the manually-activated data transmission switch 35a is depressed within a predetermined time frame established by the system control subsystem 36, then the system control subsystem 36 automatically activates the data transmission subsystem 33. In response thereto, the data transmission subsystem automatically transmits the produced/buffered symbol character data to the host system (to which the bar code symbol reader is connected), a data storage buffer (e.g. disposed in a portable data collection device connected to the bar code symbol reader), or other data storage/processing device.

When the data transmission switch 35a is depressed, the collected and decoded scan data is sent to the host system 1009 via data packet transmission. Data packet interference is minimized by the random presence of interference-free time slots, during which a transmitted data packet can be received at its respective host 1009 without neighboring packet interference. However, additional measures are employed by the transmission scheme to further reduce the likelihood of data packet interference. Such measures are described in great detail in U.S. Pat. No. 5,808,285, incorporated herein by reference.

An alternative technique for establishing data communication between the automatically-activated bar code symbol reading device and its host system 1009 is by way of a 2-way RF-based data communication protocol using digital frequency shift keying (DGCK) modulation techniques, as described in U.S. Pat. Nos. 4,460,120 and 5,3221,246, incorporated herein by reference.

Another alternative technique for establishing data communication between the automatically-activated bar code symbol reading device 10 and its host system 1009 is by way of a 2-way spread-spectrum signaling techniques, as described in U.S. Pat. Nos. 5,418,812; 5,029,183; 5,280,498; 5,142,550; 5,528,621; and 5,479,441, each incorporated herein by reference.

By virtue of the novel system control architecture, the user is permitted to read bar code symbols in a highly intuitive manner, wherein bar code detection and bar code symbol reading are carried out in an automatic manner while data transmission of decoded symbol character data to the host device is enabled by manual-activation of switch 103 located on the exterior of the hand-supportable scanner housing 20.

The structure and function of the general system design of FIG. 8 described above are described in greater detail with reference to FIGS. 9-13, wherein there is automatic detection of bar codes within the scanning field of the system.

Figure 9:
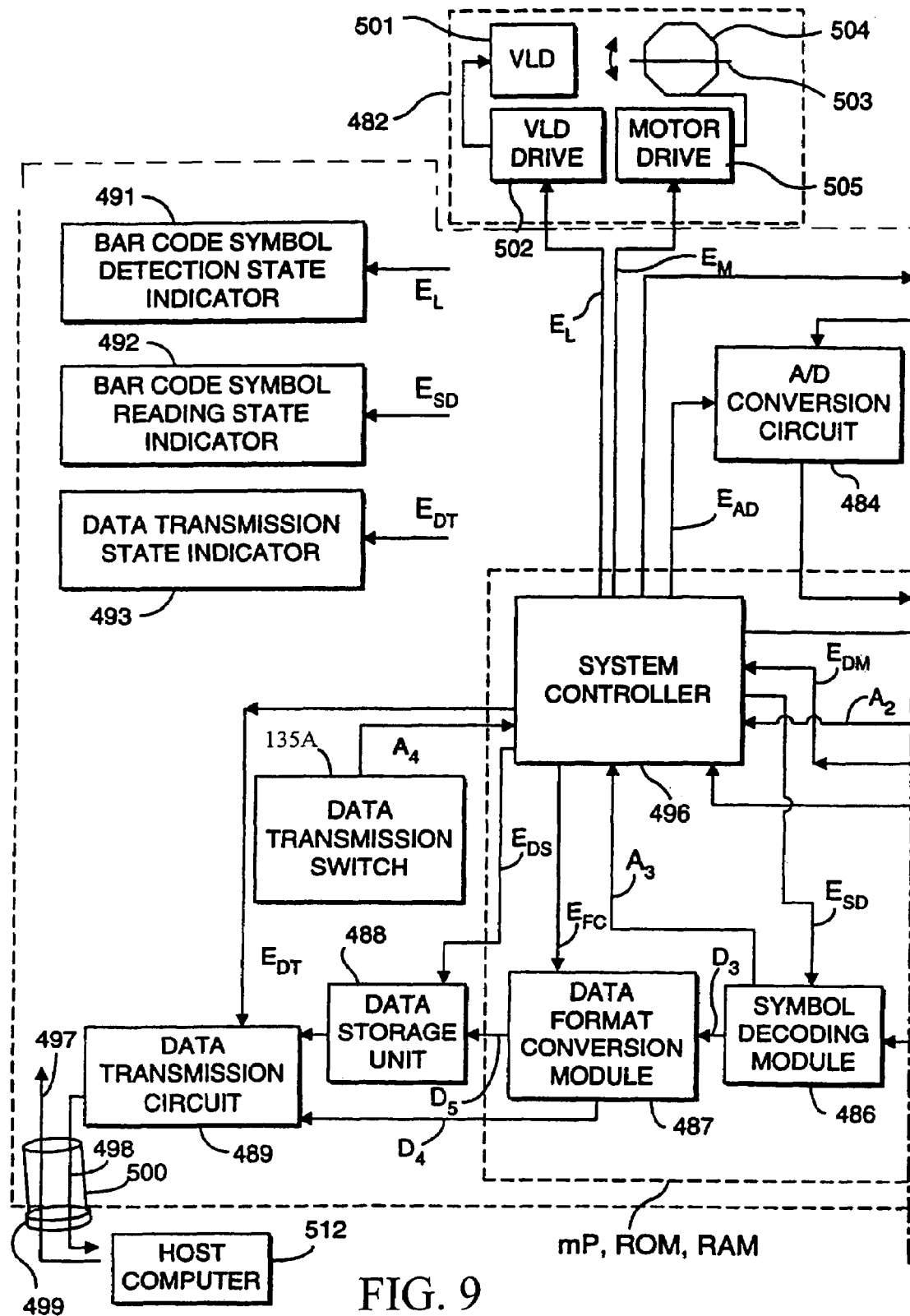
FIGS. 9 and 10, taken together, are a system block functional diagram of the detailed system design for the laser scanning bar code symbol reading system of the present invention, wherein bar code symbol presence detection and bar code symbol reading are employed during system operation.
Figure 10:
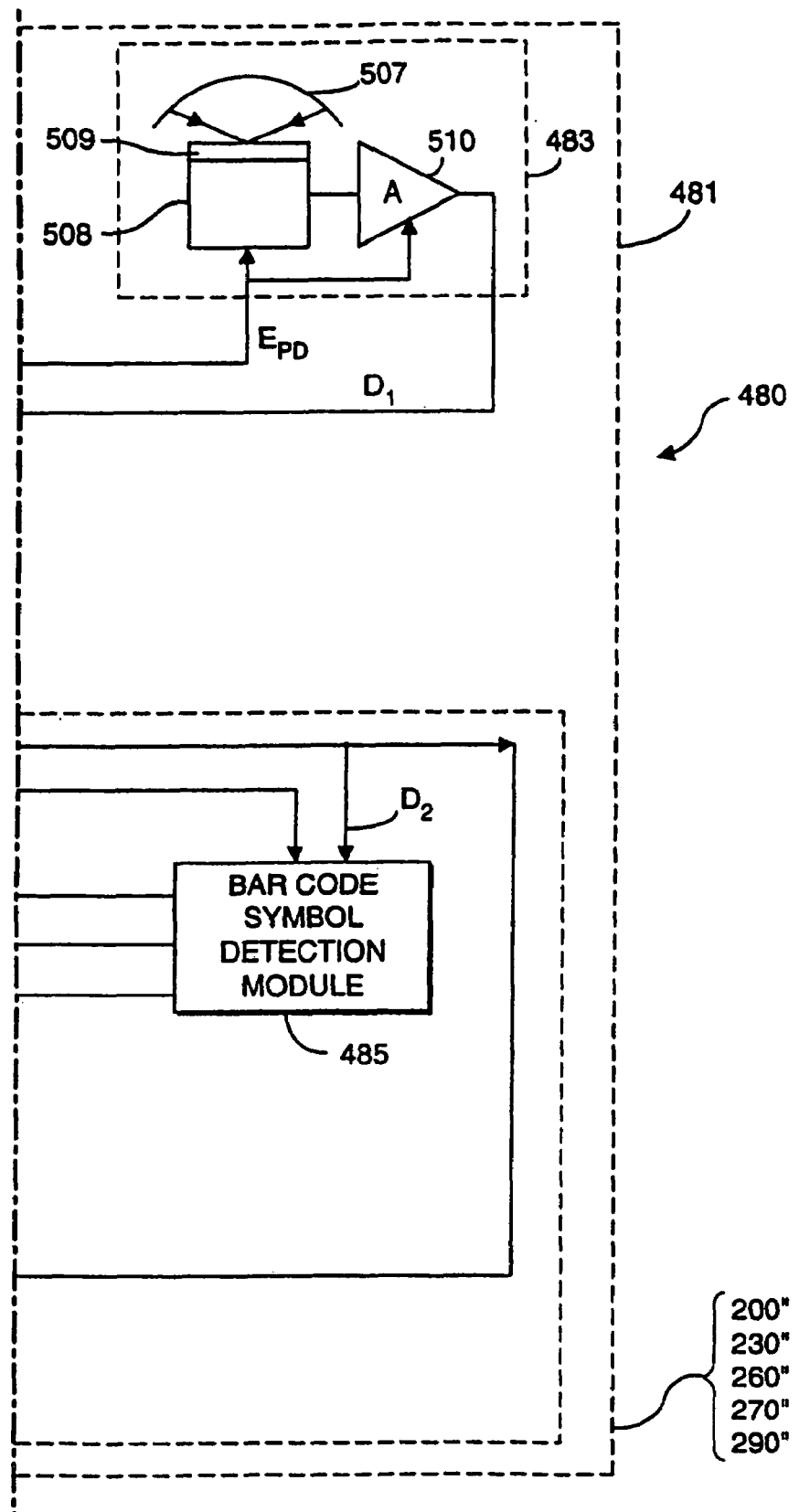

The laser-based bar code symbol detection subsystem 31 is realized from various electro-optical and electromechanical components assembled together, as shown in FIGS. 9 and 10, so as to enable automatic detection of bar code symbols on detected objects within the laser-based bar code detection field of the system. Also, the laser-based bar code symbol reading subsystem 50 is realized from various electro-optical and electro-mechanical components assembled together as shown in FIGS. 9 and 10, so as to enable automatic reading of detected bar code symbols within the laser-based bar code reading field of the system. This system design requires that a low-power (non-visible) laser beam be continuously or periodically generated within the bar code symbol detection field during system operation. While the bar code scanner 10 described hereinabove is connected to its host computer 1009 by way of RS232 wires wrapped in a flexible cord-like structure, it should be understood that the present invention may alternatively be connected to a base unit, host computer, data processor or data storage device or like device, and the connection may take other forms such as wireless data communication link. In general, a wireless data communication link can be realized in a variety of different ways, namely: using the two-way RF communication link of the type disclosed in U.S. Pat. Nos. 4,460,120; 5,321,246 and 5,142,550 or using the one-way data transmission link as disclosed in U.S. Pat. No. 5,808,285 to Rockstein, et al; etc. Each of these US Patents are incorporated herein by reference in its entirety.

In the illustrative embodiment, electrical power from a low voltage direct current (DC) power supply (not shown) is provided by way of a flexible power lines that are integrated with the RS232 data lines. Notably, the DC power supply can be realized in host computer system 1009 or as a separate DC power supply adapter pluggable into a conventional 3-prong electrical socket. Alternatively, a rechargeable battery power supply may be provided.

The compact laser scanner 10 is designed for connection at jack 500 to a host system 1009 (such as a conventional desktop computer) using a 10-pin RS232 network cable with an RJ45 coupling 499. For example, a cable with built in power jack available from Metrologic as part number MLPN 54-54000 may be used. The power jack interfaces directly with a standard AC to DC Power Transformer-Regulated 5.2VDC @650 mA output to provide power to the scanner 10. To connect the scanner 10, the user connects the 10-pin RJ45 male connector 499 into the female jack 500 at the rear of the scanner 10, and connect the male plug of the power supply into the power jack on the cable. To remove the cable from the scanner 10, it is recommended that the power on the host system be turned off and the power supply disconnected from the cable. The cable can then be safely removed from the scanner 10 by locating a small 'pin-hole' on the back of the scanner. An ordinary paperclip (or other small metallic pin) can then be inserted into the small pin-hole to depress the tongue on the RJ45 connector 499, thereby releasing the cable so that it will slide out of the scanner 10.

Figure 12:
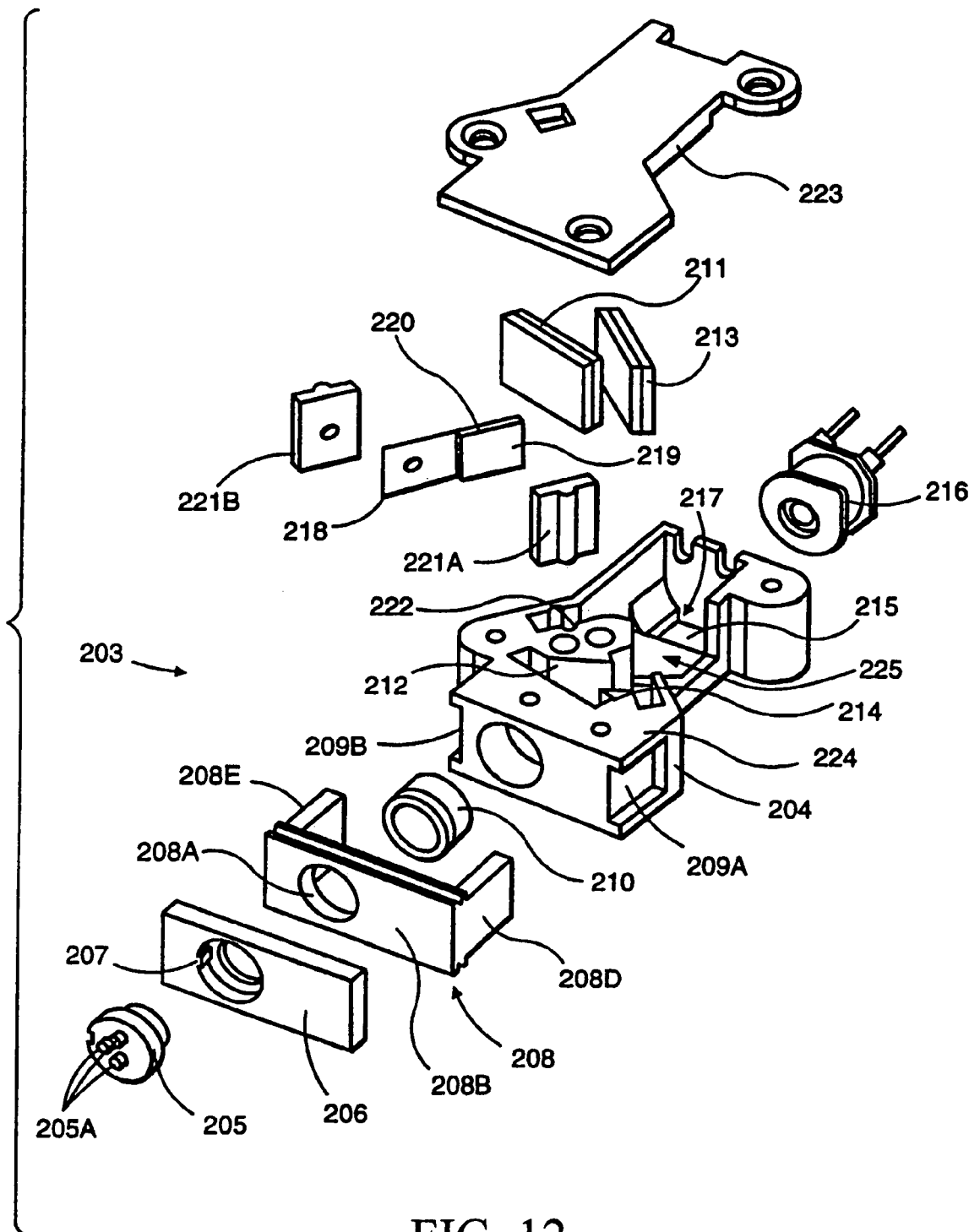
FIG. 12 is an exploded diagram of the integrated scanning module 501 as in FIG. 11.
Figure 13:
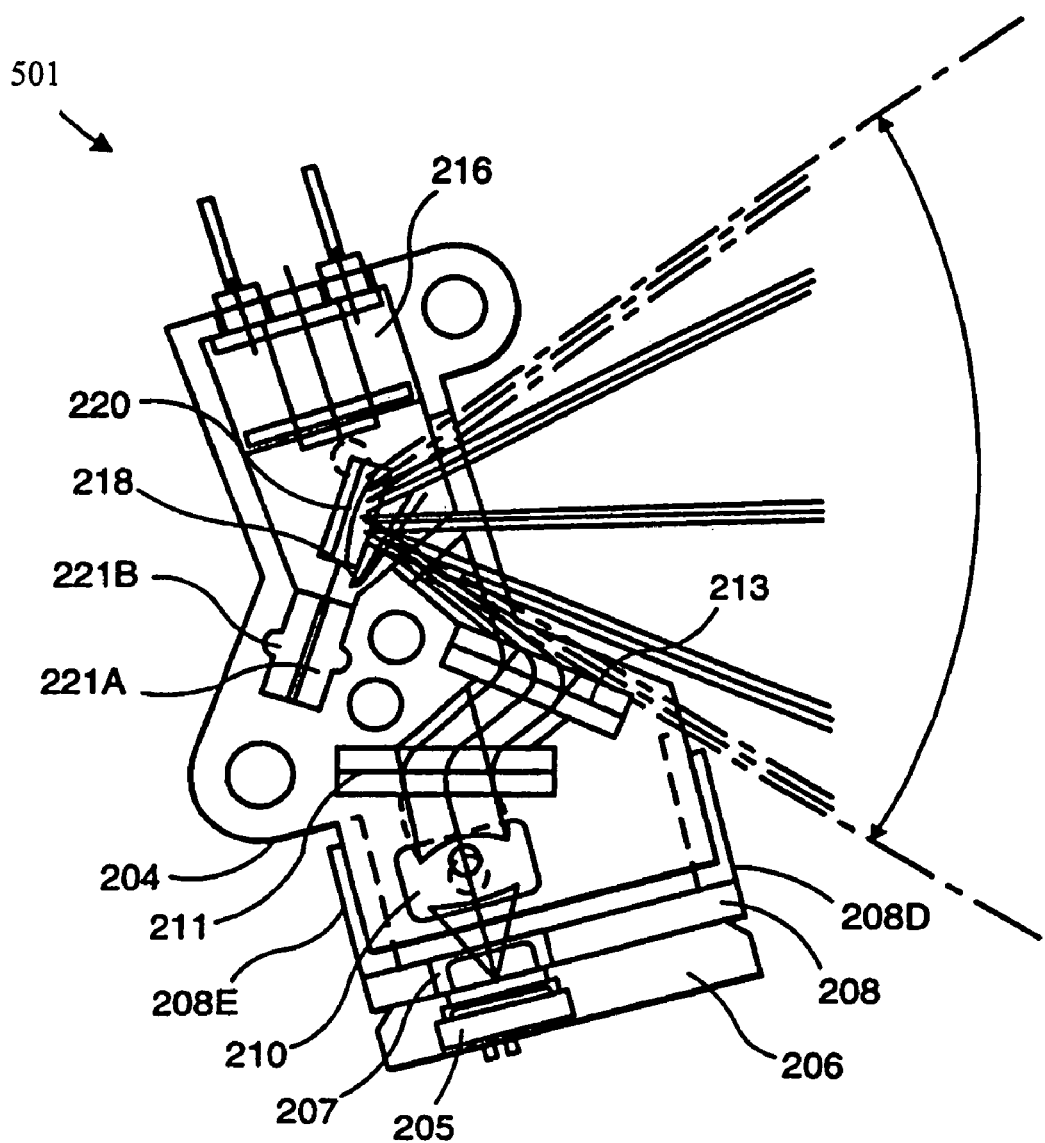
FIG. 13 is an exploded diagram of the integrated scanning module 501 of FIGS. 11-12.

As illustrated in FIGS. 9, 12 and 13, the scanning engine 501 includes a light source 482 which, in general, may be any source of intense light suitably selected for maximizing the reflectivity of the object's surface bearing the bar code symbol. In the illustrative embodiment, light source 482 is a solid-state visible laser diode (VLD) 205, which is driven by a conventional laser diode driver circuit 502. The wavelength of visible laser light produced from the laser diode is preferably in the visible range focussed about a specific wavelength such as 650 or 670 nanometers. In order to repeatedly scan the produced laser beam over the bar code symbol detection and reading fields, a planar scanning mirror and oscillating scanning element, or other scanning element 503, based on principles of reflection, diffraction and/or refraction, is moved by an electrically-powered scanning motor 504 driven by a driver circuit 505. While one suitable flipper-type scanning element is disclosed in co-pending application Ser. No. 09/154,020, filed Sep. 16, 1998, it is understood that other types of scanning mechanisms, known in the art or to be developed in the future, may be used to practice this generalized embodiment of the present invention. Thus, one of a variety of conventional laser scanning mechanisms may be alternatively used with excellent results.

To selectively activate laser light source 482 and scanning motor 504, the system controller 496 provides laser diode scanner enable signal EL, and scanning motor enable signal EM, as input to driver circuits 502 and 505 respectively. When enable signal EL is a logical high level (i.e. EL=1) a laser beam is generated from VLD 205 and projected through the light transmission window of the scanner housing 20, and when EM is a logical high level the laser beam is repeatedly scanned across the bar code symbol detection and reading fields 9 and 11 respectively, depending on the mode of operation of the system.

When a bar code symbol on an object is within the bar code symbol detection field 9 at the time of scanning, the incident laser light on the bar code will be scattered and reflected. This scattering/reflection process produces a laser light return signal of variable intensity which represents a spatial variation of the light reflectivity characteristics of the spaced apart pattern of bars comprising the bar code symbol. Photoreceiving circuit 483 detects at least a portion of the reflected laser light of variable intensity. Upon detection of this reflected laser light, photoreceiving circuit 483 produces an analog scan data signal D1, indicative of the detected light intensity.

In the illustrative embodiment, photoreceiving circuit 483 generally comprises laser light collection optics 507, which focus reflected laser light for subsequent detection by a photoreceiver 508 having, mounted in front of its sensor, a frequency selective filter 509 which only transmits optical radiation of wavelengths up to a small band above 670 nanometers. Photoreceiver 508, in turn, produces an analog signal which is subsequently amplified by preamplifier 510 to produce analog scan data signal D1. The laser scanning mechanism 482 and the photoreceiving circuit 483 cooperate to generate analog scan data signals D1, from the scanning field over time intervals specified by the system controller 496. As will be illustrated hereinafter, these scan data signals are used by bar code symbol detection module 485, and symbol decoding module 486, to perform particular functions. As illustrated in FIGS. 9 and 10, analog scan data signal D1, is provided as input to A/D conversion circuit 484. As is well known in the art, A/D conversion circuit 484 processes analog scan data signal D1, to provide a digital scan data signal D2 which resembles, in form, a pulse width modulated signal, where logical "1" signal levels represent spaces of the scanned bar code and logical "0" signal levels represent bars of the scanned bar code. A/D conversion circuit 484 can be realized by any conventional A/D circuit well known to those with ordinary skill in the art. Digitized scan data signal D2 is then provided as input to bar code symbol detection module 485, and symbol decoding module 486. The purpose and function of bar code symbol detection module 485 is to determine whether a bar code is present in or absent from the bar code detection field 9 over particular intervals specified by the system controller 496. When a bar code symbol is detected in the bar code detection field 9, bar code detection module 485 generates second control activation signal A2 which is provided as input to the system controller 496, as shown in FIGS. 9 and 10. Preferably, bar code symbol detection module 485 is realized as a microcode program carried out by the microprocessor and associated program and buffer memory, described hereinbefore. The function of the bar code detection module 485 is not to carry out a decoding process, but rather to rapidly determine whether the received scan data signals represent a bar code symbol residing within the bar code detection field 9.

There are a number of ways in which to achieve bar code symbol detection through a programming implementation. For example, in the preferred embodiment, bar code symbol detection module 485 detects the first and second borders of the bar code symbol envelope. This is achieved by first processing a digital scan data signal D2 to produce digital count and sign data. The digital count data is representative of the measured time interval (i.e. duration) of each signal level occurring between detected signal level transitions which occur in digitized scan data signal D2, The digital sign data, on the other hand, indicates whether the signal level between detected signal level transitions is either a logical "1", representative of a space, or a logical "0", representative of a bar within a bar code symbol. Using the digital count and sign data, the bar code presence detection 485 module identifies the first and second borders of the bar code envelope, and thereby determines whether or not the envelope of a bar code symbol is represented by the scan data collected from the bar code detection field 9. When a bar code symbol envelope is detected, the bar code symbol detection module 485 provides second control activation signal A2=1 to the system controller 496. As will be described in greater detail hereinafter, second control activation signal A2=1 causes the system to undergo a transition from bar code presence detection state to bar code symbol reading state.

The function of symbol decoding module 486 is to process, scan line by scan line, the stream of digitized scan data D2, in an attempt to decode a valid bar code symbol within a predetermined time period allowed by the system controller 496. In general, when symbol decoding module 486 successfully decodes a bar code symbol within the predetermined time period, symbol character data D3 (typically in ASCII code format) corresponding to the decoded bar code symbol is produced. Thereupon, a third control activation signal A3=1 is produced by the symbol decoding module 486 and is provided to the system controller 496 in order to perform its system control functions. When the data transmission switch 35a is manually activated during a bar code symbol reading cycle, in response to the generation of activation signal A3=1, and all other conditions are satisfied (i.e. A4=1, TZ<0.5 seconds, and the symbol character data is different than the data element in the Decoded Symbol Data Buffer), then the system controller 496 automatically generates data transmission enable signal EDT=1.

The system controller 496 provides enable signals EFC, EDS, EDT, ESD, EDM, EAD, EPD, EL, and EM, to data format conversion module 487, data storage unit 488 and data transmission circuit 489, symbol decoding module 486, bar code detection module 485, A/D conversion circuit 484, photoreceiving circuit 483, VLD drive circuit 502 and scanning motor drive circuit 505, respectively, at particular stages of its control program.

Symbol decoding module 486 provides symbol character data D3 to data format module 487 to convert data D3 into two differently formatted types of symbol character data, namely D4 and D5. Format-converted symbol character data D5 is of the packed data format, particularly adapted for efficient storage in data storage unit 488. Format-converted symbol character data D4 is particularly adapted for data transmission to host computer system 1009. When symbol character data D4 is to be converted into the format of the user's choice (based on a selected option mode), the system controller 496 provides enable signal EDS to data storage unit 488. Format-converted data symbol character D4 is transmitted to host device 1009 only when data transmission control switch 35a has been activated during a bar code symbol reading cycle and all preconditions for data transmission have been satisfied within the system. Thereupon, data transmission circuit 489 transmits format-converted symbol character data DS to host computer system 1009, via the data transmission lines 498 of the flexible scanner connector cable.

Figure 11:
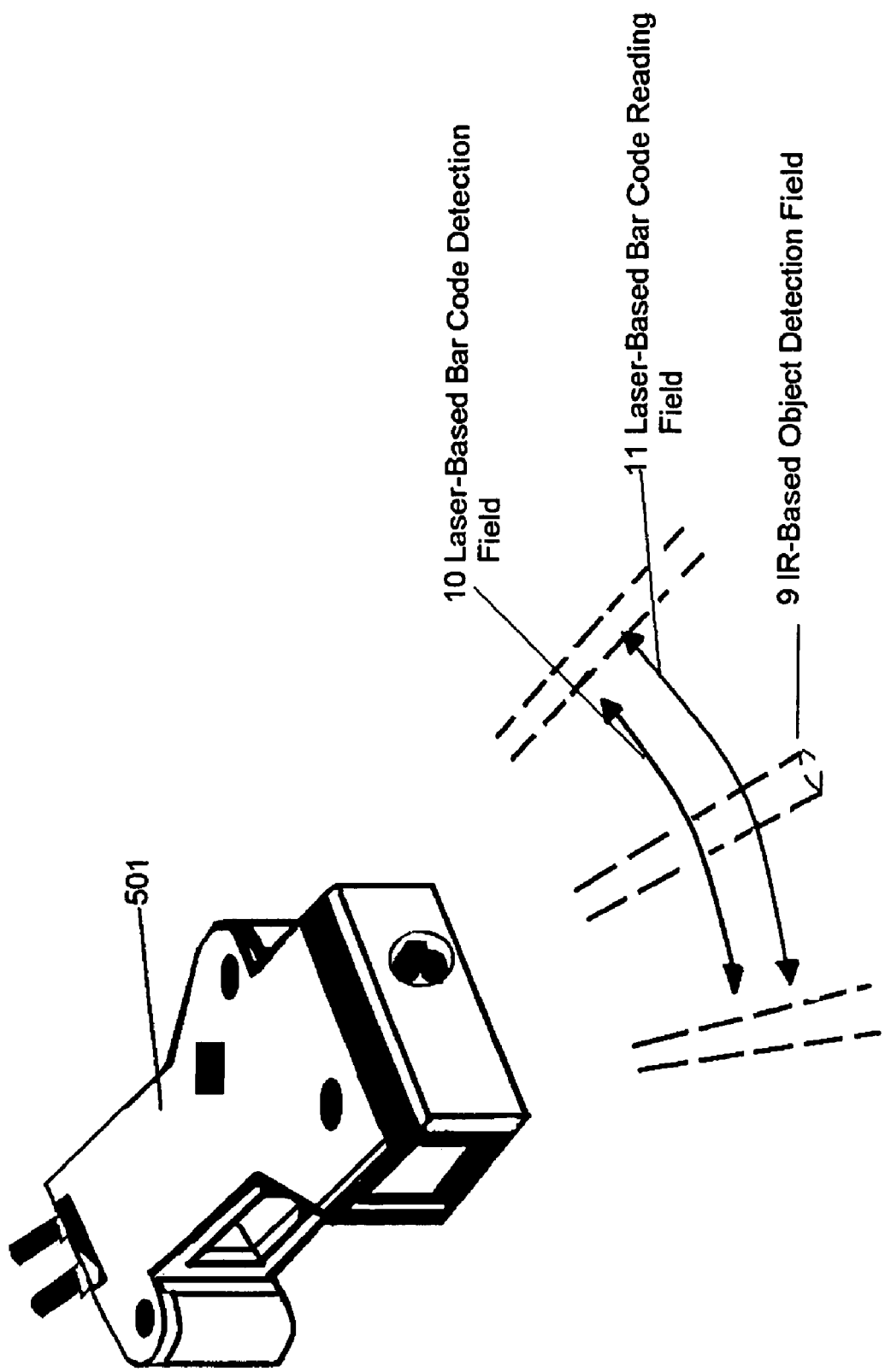
FIG. 11 is a perspective view of the integrated scanning module 501 used in the scanner 10.

In FIGS. 11-13, an exemplary embodiment of the scan module 501 is shown for producing a one-dimensional laser-based bar code symbol detection field 110 and a one-dimensional laser-based bar code symbol reading field 111. In one embodiment, the scan module 501 can include a holographic optical element (HOE)-based laser scan module 501 as disclosed in co-pending application Ser. No. 09/071,512 entitled HOE-Based System and Devices For Producing Laser Beams Having Modified Beam Characteristics filed May 1, 1998, incorporated herein by reference, for producing and scanning a laser beam across a scanning field (i.e. bar code symbol detection field, and bar code symbol reading field); with underlying PC board 601 for supporting electronic circuits used to realize the subsystems and sub-components thereof shown in FIGS. 8-10, including a photodetector 226 coupled to analog and digital signal processing circuits and an infrared transmitter 206A and an infrared receiver 206B coupled to the object detection subsystem realized on a PC board, as taught in U.S. Pat. No. 5,808,285; and a scanning window 227 for covering the transmission aperture 228 of the engine housing, and providing the optical functions taught in U.S. Pat. No. 5,789,731 incorporated herein by reference. Notably, the bar code symbol reading system 50 of FIG. 7 embodies the system architecture shown in FIGS. 8-10. As previously described, the inside struts of the lower housing portion function as a platform whereupon the majority of optical and electro-optical components of the system 50 are mounted. The inside surface of the lower housing portion supports PC board 601 on which some the circuits of FIGS. 8-10 are. The laser beam produced by scanning engine 501 exits the housing 20, and return laser light is detected by photodetector 226.

As shown in FIG. 11, the integrated scan module 501 repeatedly scans the produced laser beam over bar code symbol detection and reading fields 110 and 111, respectively, both of these fields having a predetermined spatial extent in front of the engine or scanner housing. Integrated scan module 501 comprises an assembly of sub-components, namely: a module housing 204 made of lightweight plastic and serving as an optical bench for the optical components within the laser beam producing and scanning systems alike; a VLD 205 mounted to a VLD heat-sinking plate 206 through aperture 207 and producing a visible laser beam having elliptical, eccentric, divergent, and astigmatic beam characteristics in response to a voltage source applied to terminals 205A by way of a flexible circuit or other conductive structures well known in the art; a mounting bracket 208 having an aperture 208A for receiving a portion of the casing of the VLD 205 and a planar surface 208B affixing the associated heat-sinking plate 206 thereto, and also having side projections 208D and 208E for slidable receipt within spaced apart recesses 209A and 209B formed in the rear portion of the module housing 204; a collimating lens 210 for focusing the laser beam produced from the VLD; fixed spatial-frequency HOE 211, securely mounted within a first mounting slot 212 formed in the module housing 204, for modifying the beam characteristics of the laser beam output from collimating lens 210; fixed spatial frequency HOE 213, securely mounted within a second mounting slot 214 formed in the module housing 204, for modifying the beam characteristics of the laser beam produced from HOE 213 to produce the output laser beam; a radiation-absorbing wall surface 215 formed in the module housing 204, aligned with the zeroeth-order diffraction beam from HOE 213, and absorbing the zero-order diffraction beam produced from HOE 213; electromagnetic (i.e. coil) 216 mounted within recess 217 in the module housing 204, for producing a magnetic force field in response to electrical current supplied to the input terminals thereof; scanning element 218 supporting light deflecting element (e.g. mirror, hologram, refractive element, etc.) 219 on the front surface of its free end, and permanent magnetic element 220 on the rear surface of its free end; mounting plates 221A and 221B for clamping the base portion of the scanning element 218, and mounting the same within recess 222 formed within the module housing 204; and a housing cover plate 223 for attachment to the top surface 224 of the module housing 204, and securing the laser beam producing and scanning mechanism components therewithin, while forming a scanning window 225 through which a scanned laser beam can be projected out into a scan field (e.g. bar code symbol detection field or bar code symbol reading field) for scanning.

In FIG. 13, the integrated scan module 501 of FIG. 12 is shown completely assembled. As illustrated, the output laser beam is scanned over its scan field which serves as the bar code symbol detection field and bar code symbol reading field, during bar code symbol detection and reading modes of operation, respectively. For greater details regarding the integrated scanning module of FIGS. 11 through 13, reference can be made to U.S. application Ser. No. 09/071,512 filed May 1, 1998, incorporated herein by reference.

Figure 14A:
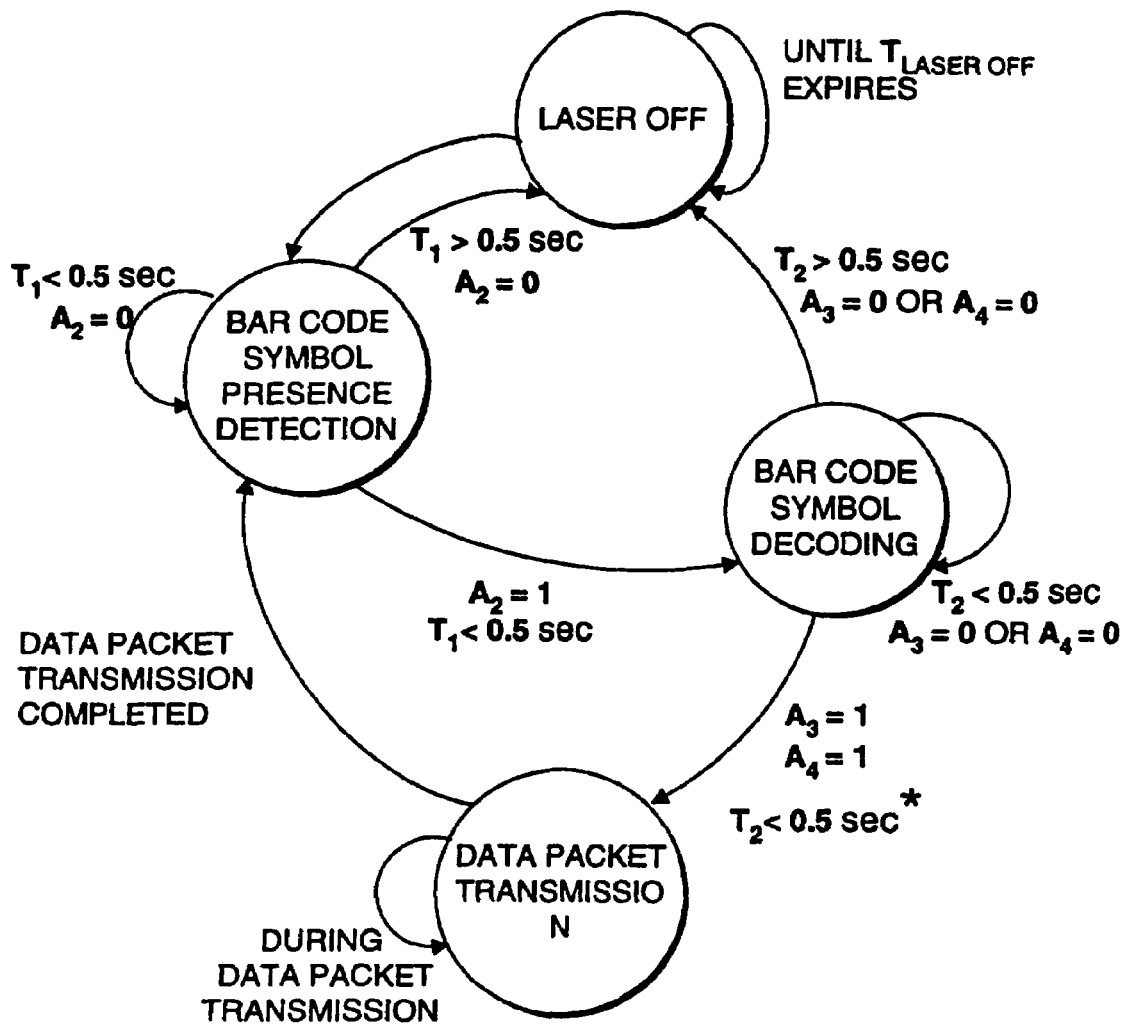
FIG. 14A is a state diagram illustrating the various states that the automatically-activated bar code symbol reading system of FIGS. 8-10 may undergo during the course of its programmed operation.

FIG. 14A is a state transition diagram for the scanner 10 according to the above embodiment. As illustrated in FIG. 14A, the automatic hand-supportable bar code reading device of the present invention has three basic states of operation, namely: bar code symbol presence detection, bar code symbol reading, and symbol character data transmission/storage. These three states are schematically illustrated as A, B, and C, respectively, in the state transition diagram of FIG. 14A. Transitions between the various states are indicated by directional arrows. Besides each set of directional arrows are transition conditions expressed in terms of control activation signals (e.g. A2, A3, and A4) and where appropriate, state time intervals (e.g. $T_{laseroff}$, T1, and T2). Conveniently, the state diagram of FIG. 14A expresses most simply the three basic operations during the system control process. The compact laser scanner 10 is designed to work under Bar Code Symbol Presence Detection Mode ("Blinky") mode by default, which allows the user to easily target the desired bar code. During Blinky Mode the laser beam produced by scanning engine 501 pulses on and off searching for bar code data.

Figure 14B:
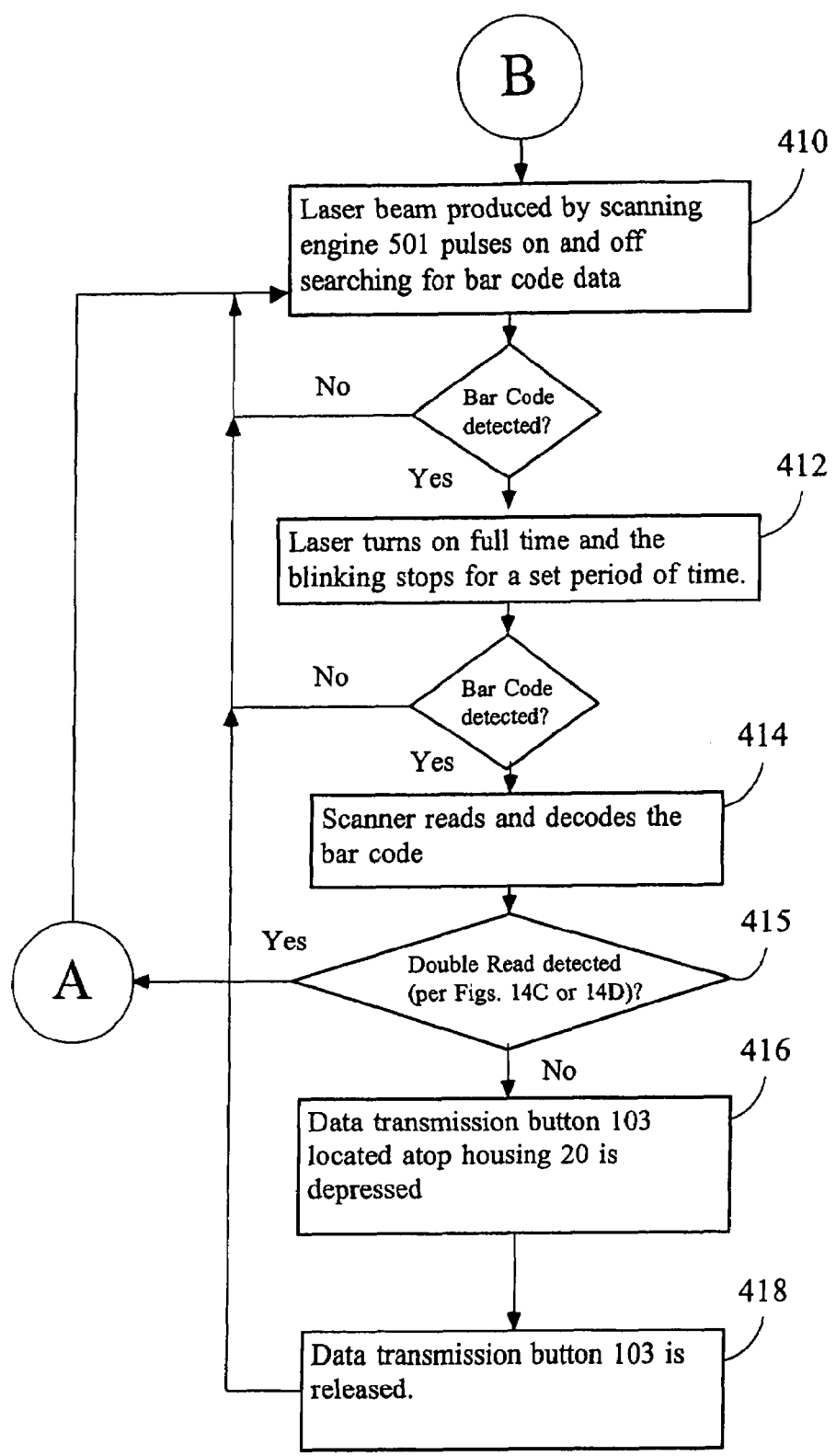
FIG. 14B is a flow diagram illustrating a normal Blinky Mode sequence as in FIG. 14A.

The normal Blinky mode sequence is shown in more detail at FIG. 14B. During normal Blinky Mode as shown at step 410 the laser beam produced by scanning engine 501 pulses on and off searching for bar code data to indicate the presence of a bar code symbol in the bar code presence detection field. At step 412, when the presence of a bar code is detected by the scanner, the laser turns on full time and the blinking stops for a set period of time. During this set period of time, if no bar code is read the method reverts back to Blinky mode as shown at step 413. On the other hand, if a bar code is detected the scanner reads and decodes the bar code at step 414. At step 416 the user finishes the data transmission simply by pressing the data transmission button 103 located atop the housing 20. During a normal Blinky Mode cycle the laser is blinking, the scanner scans the bar code, the microprocessor decodes the code, the data transmission button 103 is depressed, the data transmission button 103 is released, the laser goes back to blinking. In Blinky Mode, there does not need to be any separate object detection of any kind (IR or otherwise), although object detection as described previously may be combined with Blinky mode.

Figure 14C:
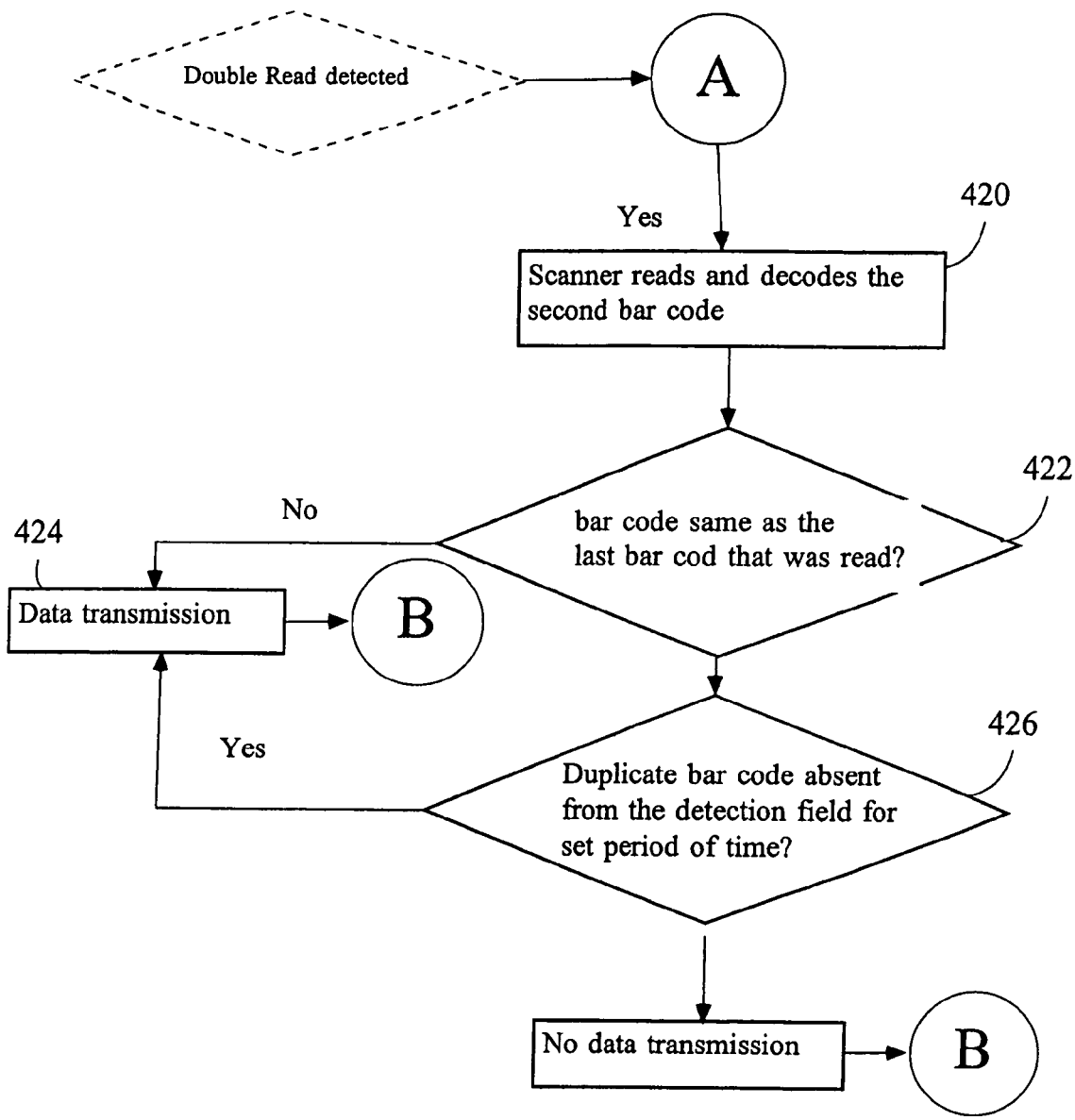
FIG. 14C is a flow diagram illustrating a method of preventing double reads employed during the normal Blinky Mode sequence of FIG. 14B.

The normal Blinky mode operation as described above can include a default feature that protects against re-reading the same bar code (e.g., a "double read"). The method of preventing double reads is illustrated in FIG. 14C. As shown in step 420, if another bar code is detected the scanner reads and decodes the bar code. At step 422, the method checks to see if the bar code is the same as the last bar code that was read. If at step 424 the bar code is different than the previous one the user finishes the data transmission simply by pressing the data transmission button 103. If, on the other hand, at step 426 the bar code data is the same, the method determines how long it has been since that same bar code was read. If the bar code is the same and was not absent from the field for the set period of time, it is not sent to host computer system 1009. The default mode of operation of device 10 includes this double read prevention feature, although it can be disabled. In addition, the parameters may be changed. For example, the double-read prevention interval is set to a default period of time of approximately 400 milliseconds, but this can be changed. Moreover, the double-read prevention feature can additionally include a manual override to facilitate situations when an operator wants to quickly read the same bar code more than once, for example, when a multiple of the same item is to be scanned. The manual override is conveniently effected by the data transmission button 103.

Figure 14D:
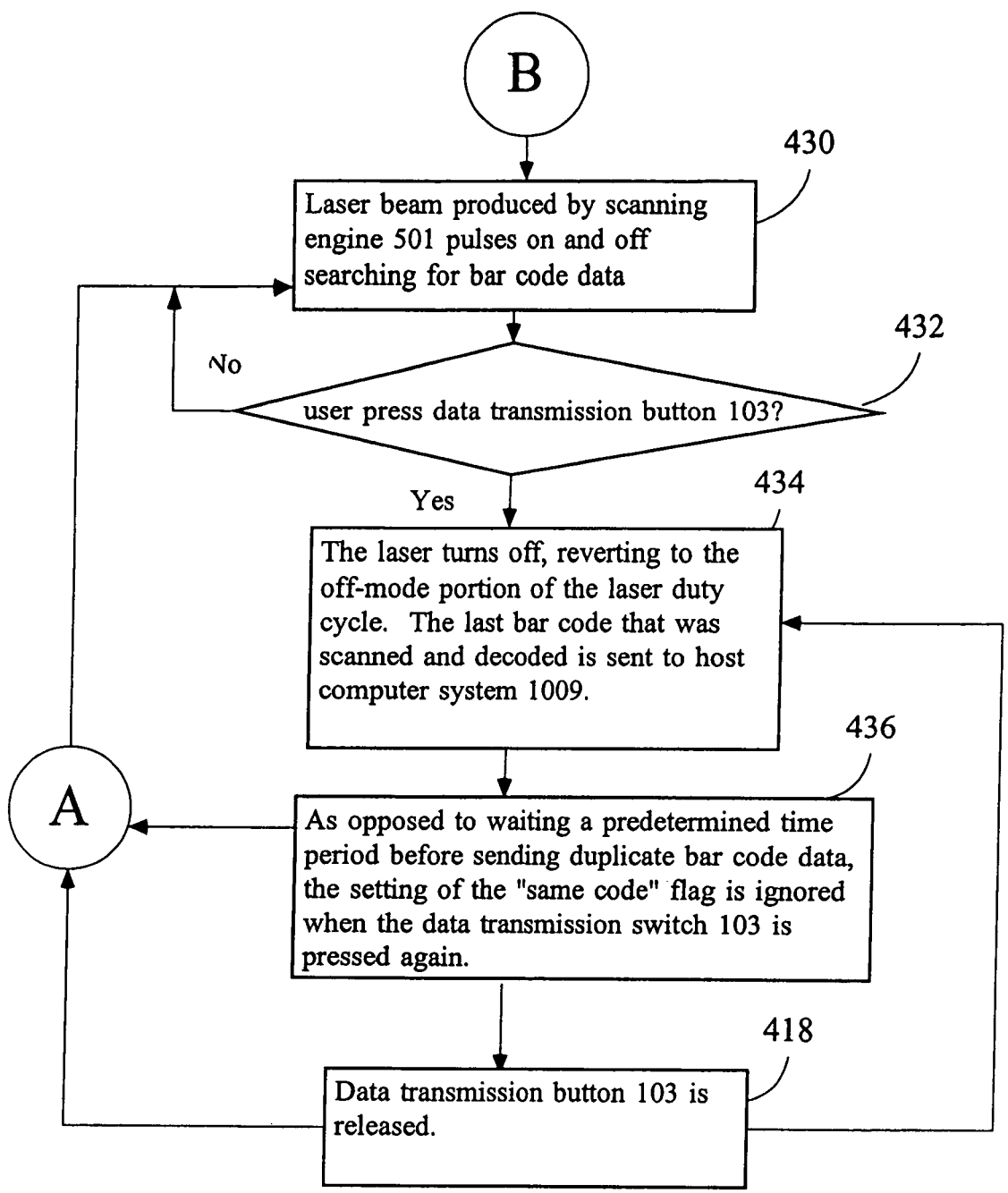
FIG. 14D is a flow diagram illustrating an augmented Blinky Mode in which a manual override sequence is provided.

The normal Blinky Mode operation of FIG. 14B and double-read prevention method of FIG. 14C (as described above) can be augmented with a manual override sequence, as shown at FIG. 14D, to allow an operator to immediately and intentionally resend the same bar code to the host computer system 1009 if desired, without any delay apparent to the operator. This is an important feature when multiples of the same type of item are being scanned, for example, four cartons of orange juice. It entails a modified Blinky mode sequence which is shown in more detail at FIG. 14D. During modified Blinky Mode as shown at step 430 the laser beam produced by scanning engine 501 pulses on and off continuously searching for bar code data to indicate the presence of a bar code symbol in the bar code presence detection field. The laser does not turn on full time, but remains pulsing-on/off, even when the presence of a bar code is detected by the scanner 10. In this situation, as shown at step 432, the user lines up the blinking laser with the object to be scanned and presses the data transmission button 103. At step 434, once the button 103 is depressed, the laser is turned off and the last bar code that was scanned and decoded is sent to host computer system 1009. At step 436, when the button is released the laser reverts to blinking. Turning the laser off interrupts the normal Blinky Mode cycle as described above. As opposed to waiting a predetermined time period before sending duplicate bar code data, the setting of the "same code" flag is ignored when the data transmission switch 103 is depressed again, as that action tells the scanner 10 that the appropriate time has passed and it can now again transmit the same bar code to the host computer system 1009. This override feature allows the operator to immediately resend the same bar code to the host when needed without any delay apparent to the user. Again, if the customer purchases four of the same item, the user can just hold the scanner over the code and depress the data transmission button 103 four times to register that four of that item has been purchased.

The foregoing combination of operating features and optional use of the same makes the compact laser scanner 10 well-suited for menu scanning, point-of-sale, document processing and inventory control.

Figure 15A:
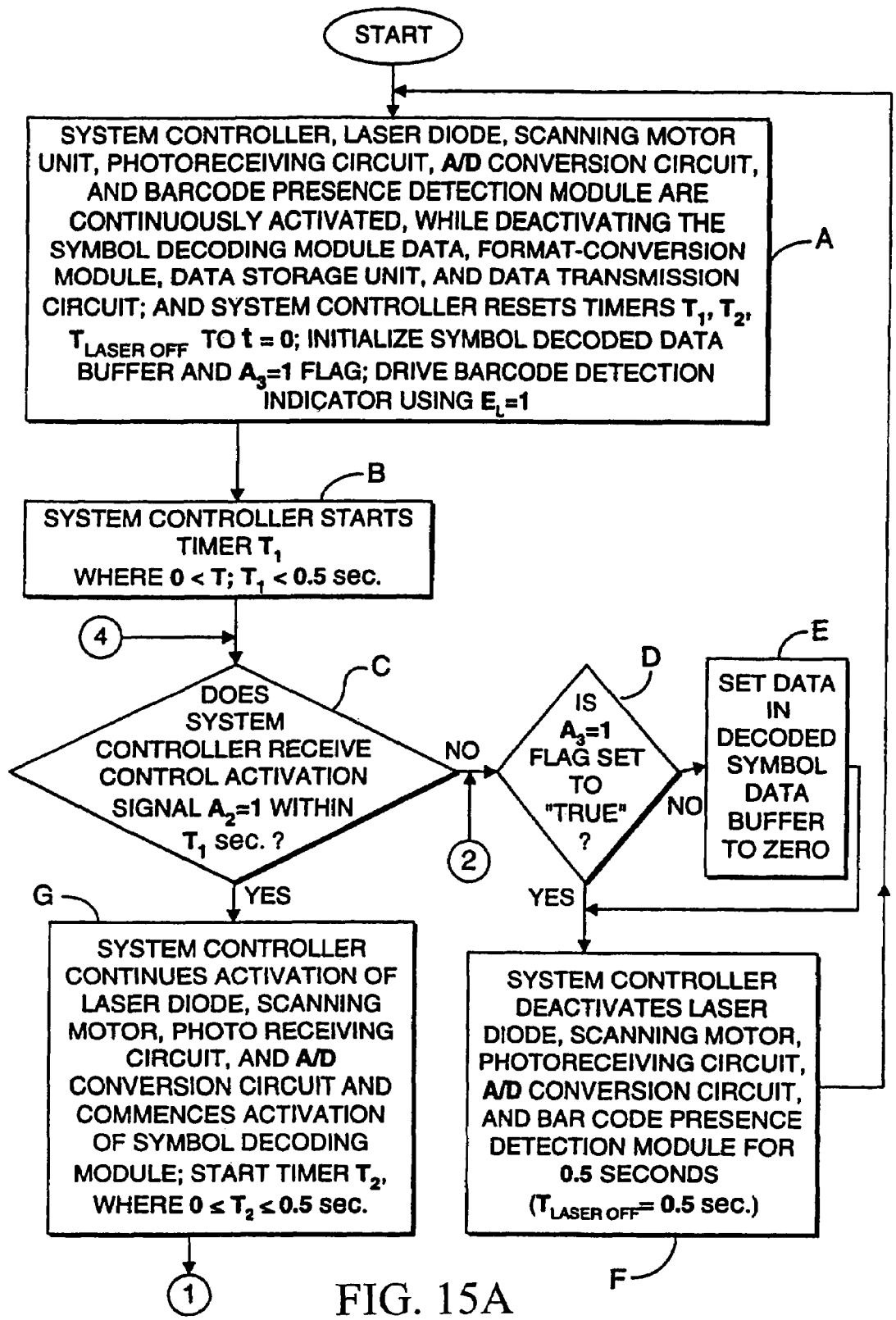
FIGS. 15A to 15C, taken together, show a high level flow chart of the control process performed by the control subsystem of the bar code symbol reading system of FIGS. 8-10, illustrating its various modes of bar code presence detection, bar code symbol reading and symbol character data transmission.
Figure 15B:
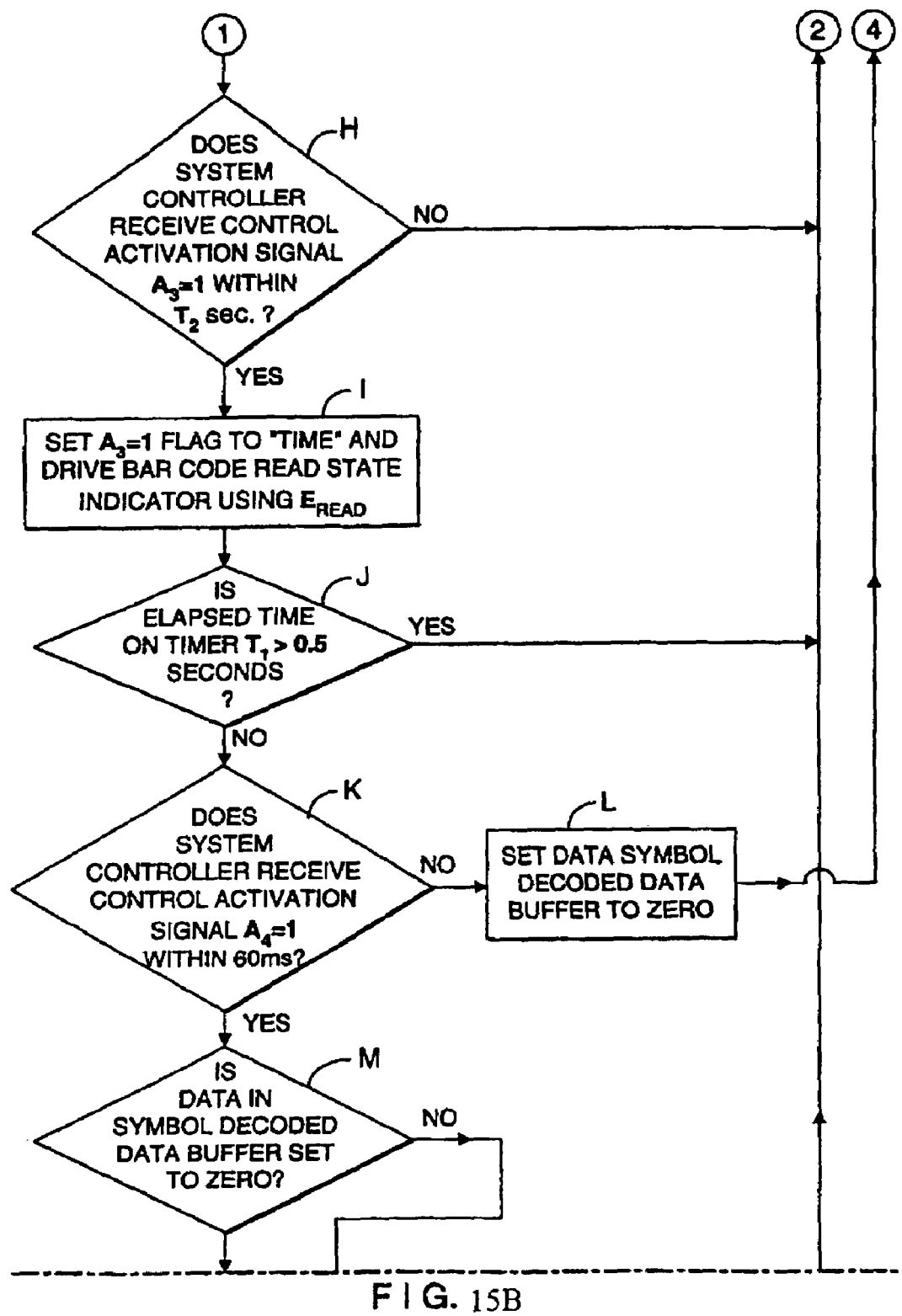
Figure 15C:
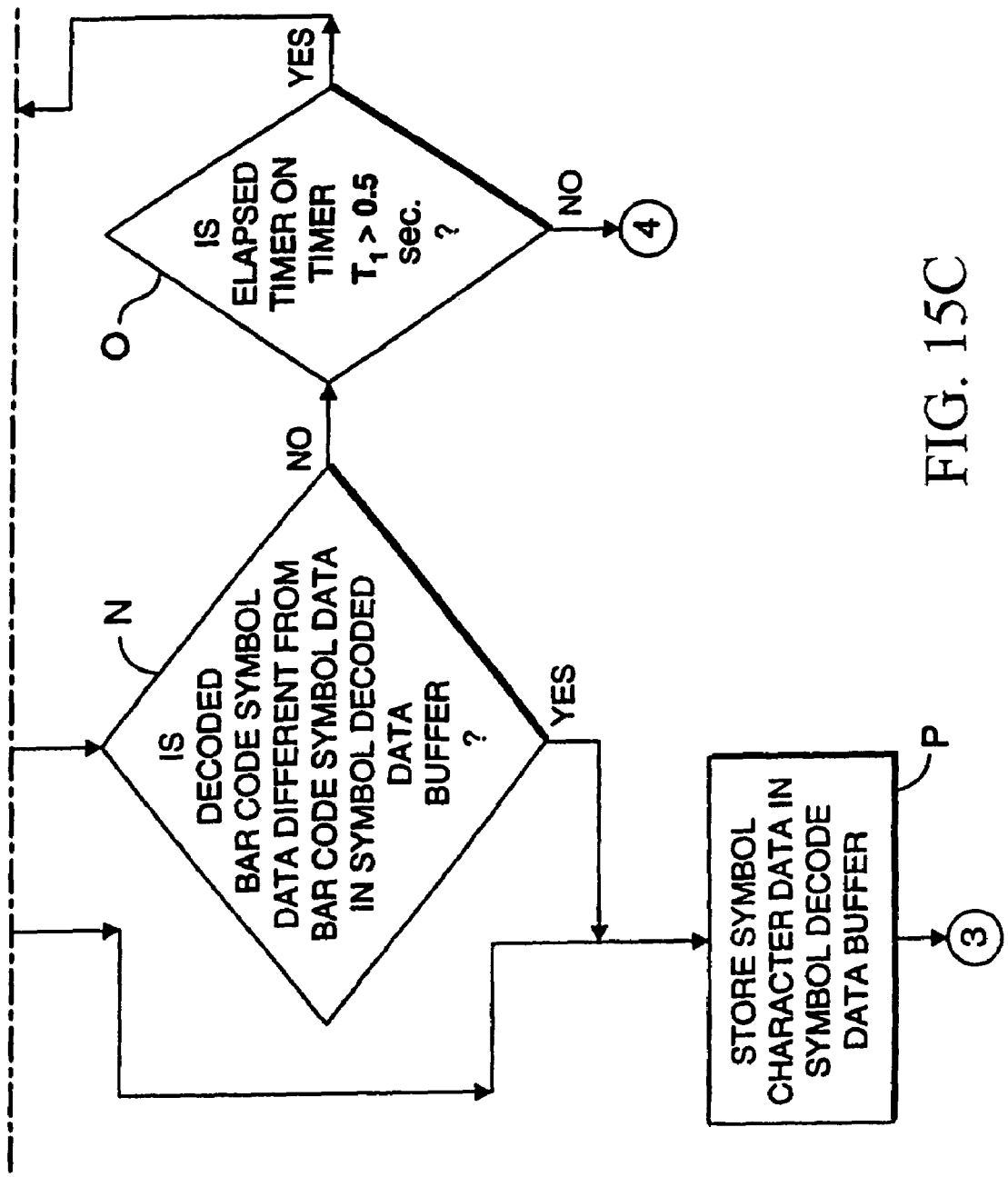

The system control process underlying the foregoing generalized system design is illustrated in more detail in the flow chart set forth in FIGS. 15A through 15C. The bar code symbol reading system of FIG. 8 embodies the system architecture shown in FIGS. 9 and 10 and carries out the control process illustrated in FIGS. 15A through 15C, and bounded by the state transition diagram of FIG. 14A.

The visual and audio indicators provided on the scanner housing 20 indicate that a bar code symbol has been successfully read in a fully-automatic manner, and that the system is ready for data transmission enablement to the host system 1009 or like device. Specifically, LED indicators 42, 44 are visible through the crescent indicator windows 30, and a small piezo speaker 46 is audible through housing 20. The pitch or note sequence assigned to speaker 46 is stored in a memory (e.g. EPROM) on the system control module 601, and can be programmed at the time of system set-up and modified as required. Preferably, each pitch and each note sequence is selected so that it can be readily distinguished and recognized by the operator to which it is uniquely directed.

For example, on power up the green LED 42 will turn on, then the red LED 44 will flash and the scanner 10 will beep once. The red LED 44 will remain on for the duration of the beep. The scanner 10 is now ready to scan.

If both the green and red LEDs 42, 44 are off, the scanner 10 is not receiving power from the host device 1009 or transformer.

Generally, the green LED 42 remains on during normal pulse or continuous laser operation and it blinks during power save mode.

Steady green from LED 42, a single red flash from LED 44, and a beep indicates that the scanner 10 has successfully read a bar code. If the red LED 44 does not flash, the scanner 10 does not beep, then the bar code has not been successfully read. When accompanied by a razzberry tone, it indicates that an invalid bar code has been scanned.

Steady green from LED 42 and steady red from LED 44 after a successful read indicates that the scanner 10 can transmit the data to the host device 1009. If the host is not ready to accept the information, the scanner's red LED 44 will remain on until the data can be transmitted.

However, flashing green from LED 42 after a period of inactivity indicates that the scanner has entered a power saver mode. When a bar code enters the laser field, the scanner will wake up and return to normal pulse mode.

The LEDs 42, 44 may also be used as diagnostic indicators and mode indicators.

For example, steady green from LED 42, continuous flashing red from LED 44, and three beeps indicates that the scanner 10 is entering the program mode. The red LED 44 will continue to flash and the green LED 42 will stay on until the scanner 10 exits the program mode. Upon exiting program mode, the scanner 10 will beep three times and the red LED 44 will stop flashing.

When configured for communication timeout, three beeps during operation will indicate that a communication timeout has occurred. Three beeps on power up is a failure indicator, and a razzberry tone is a failure indicator or indicates an invalid code read during program mode.

When the indicators indicate that a bar code symbol is being read and decoded symbol character data is being generated, the user need only depress the data transmission enabling switch 103 on the scanner housing 20 to send the subsequently produced data to the host system 1009 or like device.

It is noteworthy that the LEDs 42, 44 may be reprogrammed for alternative uses and/or signaling patterns as desired.

Having now set forth the preferred embodiments and certain modifications of the concepts underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A housing for a hand-held bar code symbol reader of a type comprising A scanning module for projecting a scanning pattern of light toward an object and for receiving reflected light therefrom, and a control module for producing scan data corresponding to the reflected light, said control module having a switch mounted thereon to cause said control module to transmit the scan data to a host system, the housing comprising:
- a plastic head portion for housing the scanning module, said head portion having a light transmission aperture positioned at one end thereof and a scan window mounted in said transmission aperture for passing the scanning pattern from said scanning module reflected light therefrom, and a manual detent button integrally formed in the plastic of said head portion there atop, said detent button being in operative contact with the control module switch for actuation by a user to cause said control module to transmit the scan data to said host system;
- a handle portion for housing the control module, said handle portion being integrally joined at one end to said head portion and extending therefrom at an angle.

2. The housing for a bar code symbol reader as recited in claim 1, wherein said head portion and handle portion are formed in two molded interlocking half-sections each including an upper half-head section and a lower half-handle section that join together to define said head portion and integral handle portion.

3. The housing for a bar code symbol reader as recited in claim 2, wherein the manual detent button further comprises a resilient section integrally molded into said half-head portion that may be manually depressed into engagement with the control module switch.

4. The housing for a bar code symbol reader as recited in claim 3, wherein the manual detent button and half-head portion are formed of a single piece of molded plastic.

5. The housing for a bar code symbol reader as recited in claim 4, wherein the motion of the manual detent button is limited by inherent flexibility of the plastic from which they are molded, thereby preventing damage resulting from excess pressure exerted by a user.

6. The housing for a bar code symbol reader as recited in claim 1, wherein said head portion further comprises an extended portion protruding over said light transmission aperture for preventing said scan window from contacting objects to be scanned, thereby preventing damage to said scan window.

7. The housing for a bar code symbol reader as recited in claim 1, wherein said handle portion further includes a pair of protrusions integrally formed at an opposite end from said head portion and operative in conjunction with said extended portion of the head portion to provide support to allow said hand-held housing to be rested on a flat surface.

8. The housing for a bar code symbol reader as recited in claim 7, wherein said pair of protrusions comprise a pair of spaced feet.

9. The housing for a bar code symbol reader as recited in claim 1, wherein said head portion further comprises and indicator window positioned adjacent a manual switch for directing an indicator light signal to a user holding the hand-held housing.

10. The housing for a bar code symbol reader as recited in claim 9, wherein said indicator window is mounted atop the head portion and faces rearwardly opposite said scan window for directing indicator light signals from within said housing backward toward the user's line of sight.

11. The housing for a bar code symbol reader as recited in claim 10, wherein said indicator window directs indicator light signals from LED indicator lights mounted on said control module backward toward the user's line of sight.

12. The housing for a bar code symbol reader as recited in claim 10, wherein said indicator window is crescent shaped, at least partially encircling and accentuating said detent button.

13. The housing for a bar code symbol reader as recited in claim 1, wherein said extended portion protruding over said light transmission aperture further comprises a rubber bumper attached to said head portion.

14. A hand-held housing for a bar code symbol reader comprising:
- a plastic scanning head portion housing a scanning module, said head portion having a forward aperture for projecting a scanning pattern and receiving reflected light there through, and a scan window covering said aperture;
- a handle portion integrally joined at an angle to said head portion and housing a control module that produces scan data from a bar code symbol on an object located in advance of said head portion, and for transmitting the scan data to a host system;
- a manual detent integrally formed in the plastic of said head portion there atop, said detent being in operative contact with the control module for actuation by a user to cause said control module to transmit the scan data to said host system.

15. The housing for a bar code symbol reader as recited in claim 14, wherein the manual detent further comprises a resilient button integrally molded into said scanning head portion that may be manually depressed into engagement with the control module.

16. The housing for a bar code symbol reader as recited in claim 14, wherein said head portion and handle portion are formed in two molded interlocking half-sections each including an upper half-head section and a lower half-handle section that join together to define said head portion and integral handle portion.

17. The housing for a bar code symbol reader as recited in claim 16, wherein the manual detent further comprises a resilient area integrally molded in said scanning head portion that may be manually depressed into engagement with the control module.

18. The housing for a bar code symbol reader as recited in claim 17, wherein the manual detent resilient area and half-head portion are formed of a single piece of molded plastic.

19. The housing for a bar code symbol reader as recited in claim 18, wherein the motion of the resilient manual detent area is limited by inherent flexibility of the plastic from which it and the half-head portion are molded, thereby preventing damage resulting from excess pressure exerted by a user.

20. The hand-held housing for a bar code symbol reader according to claim 14, wherein said scanning head portion further comprises a bumper conforming to the scan window and projecting forwardly therefrom for protecting said scan window.

21. The hand-held housing for a bar code symbol reader according to claim 20, wherein said housing is hand supportable by gripping said handle portion, and said handle portion further comprises a pair of balancing feet protruding downwardly there from to provide a base in conjunction with said bumper to allow resting the housing on any flat surface.

22. The hand-held housing for a bar code symbol reader according to claim 14, wherein said head portion and handle portion are integrally formed from two interlocking half-sections including an upper section and a lower section that join together.

23. The hand-held housing for a bar code symbol reader according to 22, further comprising an indicator window mounted atop the head portion of said housing for directing indicator light signals from within said housing backward toward the user's line of sight.

24. The hand-held housing for a bar code symbol reader according to claim 23, wherein said indicator window directs light from a plurality of LEDs inside said housing backward toward the user's line of sight.

25. The hand-held housing for a bar code symbol reader according to claim 24, wherein said indicator window is crescent shaped, at least partially encircling and accentuating said manual detent area.

26. The hand-held housing for a bar code symbol reader according to claim 25, wherein said crescent indicator window partially encircles and accentuates the manual detent area for visible, accessible, and convenient single handed operation, feedback and control.

* * * * *